(12) United States Patent
Xiao et al.

(10) Patent No.: US 6,944,546 B2
(45) Date of Patent: Sep. 13, 2005

(54) METHOD AND APPARATUS FOR INVERSION PROCESSING OF WELL LOGGING DATA IN A SELECTED PATTERN SPACE

(75) Inventors: Jiaqi Xiao, Houston, TX (US); Michael S. Bittar, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 62 days.

(21) Appl. No.: 10/676,467

(22) Filed: Oct. 1, 2003

(65) Prior Publication Data

US 2005/0075789 A1 Apr. 7, 2005

(51) Int. Cl.⁷ .............................................. G06F 19/00
(52) U.S. Cl. ............................................. 702/6; 703/5
(58) Field of Search ...................... 702/6, 14, 9; 703/5, 703/10; 324/359; 367/54, 38

(56) References Cited

U.S. PATENT DOCUMENTS

| | | | | |
|---|---|---|---|---|
| 5,103,429 A | * | 4/1992 | Gelchinsky ................ | 367/38 |
| 5,563,513 A | * | 10/1996 | Tasci et al. ................ | 324/359 |
| 5,703,773 A | | 12/1997 | Tabarovsky et al. ......... | 702/7 |
| 5,862,513 A | * | 1/1999 | Mezzatesta et al. ......... | 702/9 |
| 6,308,136 B1 | | 10/2001 | Tabarovsky et al. ......... | 702/7 |
| 6,597,993 B2 | | 7/2003 | Strickland et al. .......... | 702/7 |
| 6,600,995 B2 | | 7/2003 | Strickland et al. .......... | 702/7 |
| 6,603,313 B1 | * | 8/2003 | Srnka ........................ | 324/354 |
| 6,868,037 B2 | * | 3/2005 | Dasgupta et al. ........... | 367/54 |
| 2003/0093223 A1 | | 5/2003 | Zhang et al. ................ | 702/7 |

OTHER PUBLICATIONS

Howard, Jr., A. Q., "A New Invasion Model For Resistivity Log Interpretation," The Log Analyst, Mar.–Apr., 1992, pp. 96–110.

Zhang, Zhiyi, et al., "Determining Bed Boundaries From Inversion Of EM Logging Data Using General Measures Of Model Structure And Data Misfit," Geophysics, vol. 65, No. 1, Jan.–Feb. 2000, pp. 76–82.

* cited by examiner

*Primary Examiner*—John Barlow
*Assistant Examiner*—Victor J. Taylor
(74) *Attorney, Agent, or Firm*—Conley Rose, P.C.

(57) ABSTRACT

Method and apparatus for deriving information regarding a subsurface geophysical formation. Well logging data is acquired for the subsurface geophysical formation. Geometrical parameters for the subsurface geophysical formation are determined by inversion processing of the acquired well logging data in a pattern space while formation conductivities for the subsurface geophysical formation are determined by inversion processing of the acquired well logging data in a measurement space. The processing may be iteratively applied until satisfied formation parameters are achieved.

35 Claims, 10 Drawing Sheets

METHOD AND APPARATUS FOR INVERSION PROCESSING OF WELL LOGGING DATA IN A SELECTED PATTERN SPACE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

1. Technical Field

The present disclosure relates to a method and apparatus for inversion processing of well logging data. More particularly, the present disclosure relates to a method and apparatus for deriving information regarding a subsurface geophysical formation through inversion processing of well logging data, acquired for the subsurface geophysical formation, in a selected pattern space. The present disclosure further relates to a method and apparatus for deriving information regarding a subsurface geophysical formation by combining information obtained during inversion processing of well logging data, acquired for the subsurface geophysical formation, in measurement space with information obtained during inversion processing of the well logging data in a selected pattern space.

2. Description of Related Art

Generally, inversion processing relates to a methodology by which model parameters are derived from measurement data. The inversion methodology involves a search for a minimum point of an object function, commonly referenced in the art as a misfit object function, which relates a set of field measurements acquired by a data acquisition device to a simulated response, commonly referenced in the art as a set of numerically forward-computed measurements, (or "model") of the field measurements. When the misfit object function reaches its minimum point, the model used to determine the set of numerically forward-computed measurements is selected as the model underlying the field measurements. Typically, to search for the minimum point of the misfit object function, an iterative optimization scheme, which automatically adjusts the model parameters used to determine the numerically forward-computed measurements based upon the minimum point identified for prior computations of the misfit object function, is used.

The application of inversion processing techniques to well logging data was first disclosed in Lin et al., "Inversion of Induction Logging Data Using the Least Squares Approach", 25th *Annual Logging Symposium Transactions*, pgs. AA1–AA14 (Society of Professional Well Log Analysts, 1984). While a variety of applications of inversion processing techniques to well logging data have since been disclosed, most such applications have focused on improving the stability of the inversion process using various regularizations and constraints. See, for example, Dyos, "Inversion of Induction Log Data by Method of Maximum Entropy", 28th *Annual Logging Symposium*, pgs. T1–13 (Society of Professional Well Log Analysts, 1987) and Freedman et al., "Maximum Entropy Inversion of Induction Log Data", *Formation Evaluation*, pgs. 259–268 (Society of Petroleum Engineers, 1991). The construction of the misfit object function has also been studied. For example, in Zhang et al., "Determining Bed Boundaries from Inversion of EM Logging Data Using General Measures of Model Structure and Data Misfit", *Geophysics*, Vol. 65, pgs. 76–82 (Society of Exploration Geophysicists, January 2000), a 1-D nonlinear inversion of electromagnetic ("EM") logging data utilizing a generic model object function was disclosed. However, like other implementations, the object function disclosed in Zhang et al. was bound to the misfit between the field measurements and the numerically forward-computed measurements.

Current inversion processes have yet to satisfactorily address the problems of poor resolution and simultaneity. More specifically, conventional inversion processes are implemented by minimizing the misfit between the field measurements and the numerically forward-computed measurements. Although some of the parameters to be inverted in a specific application relate to the measurements directly, others are only indirectly related to the measurements. The existence of these indirect parameters complicates the inversion process considerably. Since indirect parameters have, at best, only a very weak dependence to the misfit object function, they cannot be derived without large uncertainty and are, therefore, considered to be poorly resolvable. Additionally, as previously set forth, inversion processes typically include the use of iterative optimization schemes to derive the parameters. Oftentimes, however, parameters, including both direct and indirect parameters, must be solved simultaneously. In such situations, the efficiency and reliability of the inversion process is adversely affected.

BRIEF DESCRIPTION OF THE DRAWINGS

A better understanding of the present invention can be obtained when the detailed description is considered in conjunction with the following drawings, in which.

Figure 1A:
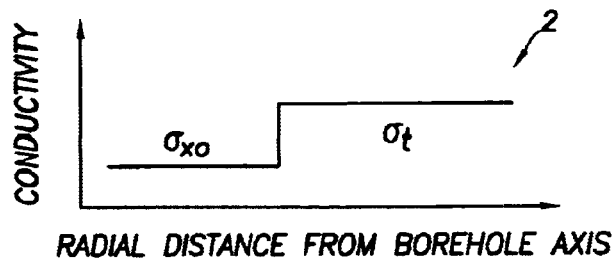
FIG. 1A illustrates a first assumed invasion profile for a subsurface formation.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

NOTATION AND NOMENCLATURE

Certain terms are used throughout the following description and claims to refer to particular system components. This document does not intend to distinguish between components that differ in name but not function.

In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical, mechanical, or thermal connection. Thus, if a first device couples to a second device, that connection may be through a direct connection, or through an indirect connection via other devices and connections.

The term "conductivity" generally refers to the ability of a material, for example, a subsurface geophysical formation, to conduct electricity. It is the inverse of resistivity and is measured in mho/m.

The term "depth of investigation" generally refers to a measure of the average radius of penetration of a subsurface geophysical formation by a signal generated by an array induction tool.

The term "invasion depth" generally refers to the distance from the borehole wall into the subsurface formation that the mud filtrate has penetrated. The term assumes equal invasion on all sides of the borehole. The depth of invasion affects whether a log measures the invasion zone, the undisturbed zone or part of each zone.

The term "invasion zone" generally refers to the volume close to the borehole in which some or all of the moveable fluids have been displaced by mud filtrate.

The term "measurement space" generally refers to a multi-dimensional Euclidean space within which all data measurements acquired using a data acquisition tool are contained.

The term "pattern recognition" generally refers to the science that concerns the description or classification of measurements. Pattern recognition techniques are suitable for use in connection with a wide variety of applications, including, but not limited to, image processing, artificial intelligence, seismic processing, radar signal processing, speech recognition techniques, character recognition techniques and electrocardiographic signal analysis.

The term "pattern space" generally refers to a space in which one or more pattern vectors are embedded.

The term "pattern vector" generally refers to a numerical description of a set of data measurements, all of which are located within the measurement space. A pattern vector may be comprised of raw data measurements or, in the alternative, filtered, baseline-corrected or otherwise pre-processed data measurements.

The term "quantitative pattern recognition" generally refers to a quantitative categorization of data obtained by an extraction of the significant features or attributes of the data from a background of irrelevant detail.

The terms "transform" and "transformation" generally refer to a mathematical operator which extracts features from a data measurement in the measurement space to become a component within the pattern space. The transformation operator may be linear, e.g., projections, wavelets and Fourier transforms or, in the alternative, non-linear in nature.

DETAILED DESCRIPTION

Array induction tools, for example, the high resolution array induction ("HRAI") tool disclosed in U.S. Pat. No. 6,597,993 to Strickland et al., are used to measure the resistivity of a subsurface geophysical formation. In accordance with the techniques disclosed herein, using the resistivity curves acquired from the investigation of a subsurface geophysical formation using an array induction tool, inversion techniques are used to determine plural model parameters, for example, true conductivity $\sigma_t$, invasion zone conductivity $\sigma_{ox}$ and invasion depth DI, for the subsurface geophysical formation. It should be noted, however, that because an array induction tool responds to its surrounding volume, including the borehole itself, the shoulder-bed formation, the mud-filtrate-invaded zone of the subsurface formation and the virginal zone of the subsurface formation, to solve for all of the model parameters for a subsurface formation, in theory, a 2-dimensional ("2-D") inversion is required for vertical wells while a 3-dimensional ("3-D") inversion is required for deviated wells.

The processing system associated with an array induction tool, however, efficiently corrects for borehole effect, matches vertical resolution and even removes the dipping effect. Once corrected in this manner, the resultant logs for a specific depth can be interpreted as logs of an infinitely thick formation. As a result, therefore, radial 1-dimensional ("1-D") inversion techniques are commonly used in well-site processing techniques to solve for $\sigma_t$, $\sigma_{xo}$ and DI. Under a radial 1-D assumption, an induction measurement $\sigma_a^i$ may be expressed in accordance with the following equation:

$$\sigma_a^i = \int_0^\infty RGF^i(r)\sigma(r)\,dr; \quad (1)$$

where:

r is the penetration of a subsurface geophysical formation by a signal generated by an array induction tool;

$\sigma(r)$ is the radial resistivity profile for the subsurface geophysical information;

RGF is the radial geometrical factor of the array induction measurements; and superscript (i) indicates the $i^{th}$ one of the array induction measurements.

Figure 1B:
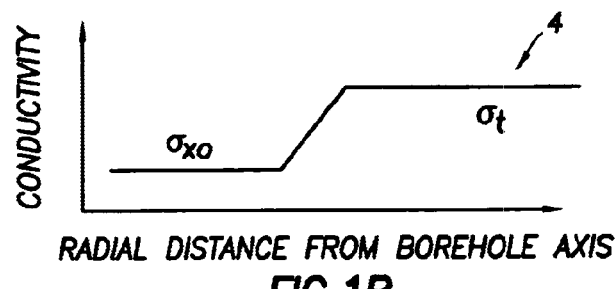
FIG. 1B illustrates a second assumed invasion profile for a subsurface formation.
Figure 1C:
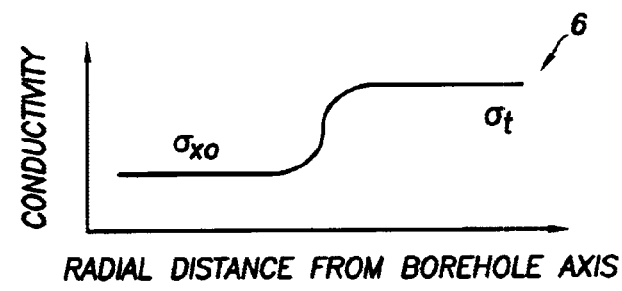
FIG. 1C illustrates a third assumed invasion profile for a subsurface formation.

If $\sigma(r)$ is an arbitrary function of the penetration of the subsurface geophysical formation by a signal generated by the array induction tool, $\sigma(r)$ is unsolvable using the limited number of measurements obtainable using the array induction tool. Accordingly, it is necessary to assume a profile for $\sigma(r)$. A first assumed profile 2 for $\sigma(r)$ is illustrated in FIG. 1A. Similarly, a second assumed profile 4 for $\sigma(r)$ is illustrated in FIG. 1B and a third assumed profile 6 for $\sigma(r)$ is illustrated in FIG. 1C. The assumed profiles 2, 4 and 6 may be distinguished from one another by their respective characteristics of the transition between invasion zone conductivity $\sigma_{xo}$ and true formation conductivity $\sigma_t$. Accordingly, the assumed profile 2 is commonly referred to as a "step" profile which assumes, as one moves radially outward from the borehole axis, an immediate transition from the invasion zone conductivity level $\sigma_{xo}$ to the true formation conductivity level $\sigma_t$. The assumed profile 4, on the other hand, is commonly referred to as a "linear transition" profile which assumes a linear transition from the invasion zone conductivity level $\sigma_{xo}$ and the true formation conductivity level $\sigma_t$. Finally, the assumed profile 6 is commonly referred to as a "smooth transition" profile. As its name implies, the assumed profile 6 assumes a smooth, curved transition between the invasion zone conductivity level $\sigma_{xo}$ and the true formation conductivity level $\sigma_t$. While a smooth transition profile, for example, the assumed profile 6 is most commonly used to interpreting induction measurements acquired by array induction tools, it should be noted that various functions may be used to describe the smooth transition between the invasion zone conductivity level $\sigma_{xo}$ and the true formation conductivity level $\sigma_t$. See, for example, Howard, "A New Invasion Model for Resistivity Log Interpretation", *The Log Analyst*, pg 96–108 (Society of Professional Well Log Analysts, March–April, 1992).

In the derivation set forth below, it has been assumed that $\sigma(r)$ has a step profile similar to the first assumed profile 2 illustrated in FIG. 1A. Of course, while the step profile has been selected for ease of derivation, it should be clearly understood that a linear transition profile similar to the second profile 4 illustrated in FIG. 1B or any one of a variety of smooth transition profiles, one of which is illustrated in FIG. 1C by way of example, may be selected as the assumed profile for $\sigma(r)$.

Assuming that $\sigma(r)$ has a step profile, Equation (1) simplifies into the following form:

$$\sigma_a^i = \sigma_{xo} * IRGF^i(DI) + \sigma_t * [1 - IRGF^i(DI)]; \quad (2)$$

where:

$\sigma_{xo}$ is the invasion zone conductivity;

$\sigma_t$ is the true formation conductivity;

DI is the invasion depth; and

IRGF is the integrated radial geometrical factor.

Thus, the invasion profile is defined by three model parameters: the invasion zone conductivity $\sigma_{xo}$, the true formation conductivity $\sigma_t$ and the invasion depth DI. As more than three independent array induction measurements have been acquired by the array induction tool, it should be possible to solve for the aforementioned three model parameters. However, because of the non-explicitness of the dependence of IRGF with DI, inversion techniques must be used when solving for the invasion depth DI, the true formation conductivity $\sigma_t$, and the invasion zone conductivity $\sigma_{xo}$.

As a first step of the inversion process, a misfit object function $O_{mis}$ is formed in accordance with the following:

$$O_{mis}(DI, \sigma_t, \sigma_{xo}) = \sum_i^N w_i \|\sigma_{am}^i - \sigma_a^i(DI, \sigma_t, \sigma_{xo})\|^p + regularization; \quad (3)$$

where:

N is the total number of measurements obtained using an array induction tool, for example, the aforementioned HRAI tool;

$\sigma_{am}^i$ is the $i^{th}$ array induction forward-computed measurement;

$\|\sigma_{am}^i - \sigma_a^i(DI, \sigma_t, \sigma_{xo})\|^p$ represents the norm of the $p^{th}$ order;

p is generally set to 2 for inversion under the least square sense;

$w_i$ is a weighting factor used to take care of measurement uncertainty; and

Regularization is a factor used to stabilize the solution of the optimization problem.

With respect to Equation (3), above, it should be noted that there are a variety of techniques suitable for use in determining the regularization and that each different technique used to determine the regularization results in a subsequent use of a different inversion technique. For example, the maximum entropy inversion technique, the maximum flatness inversion technique and the minimum oil inversion technique are each used in connection with a different regularization technique. It should also be noted that, depending on the particular optimization scheme utilized, it may be appropriate to apply a different set of constraints To determine the resolvability of the model parameters $\sigma_{xo}$, $\sigma_t$ and DI, the partial derivatives of the misfit object function $O_{mis}$ may be evaluated with respect to the model parameters. The probable conclusion of such an evaluation would be that, at best, the model parameter DI can only be poorly resolved. Such a result implies that a number of other DI-related parameters, for example, permeability induction, would also, at best, be poorly resolved.

Figure 2:
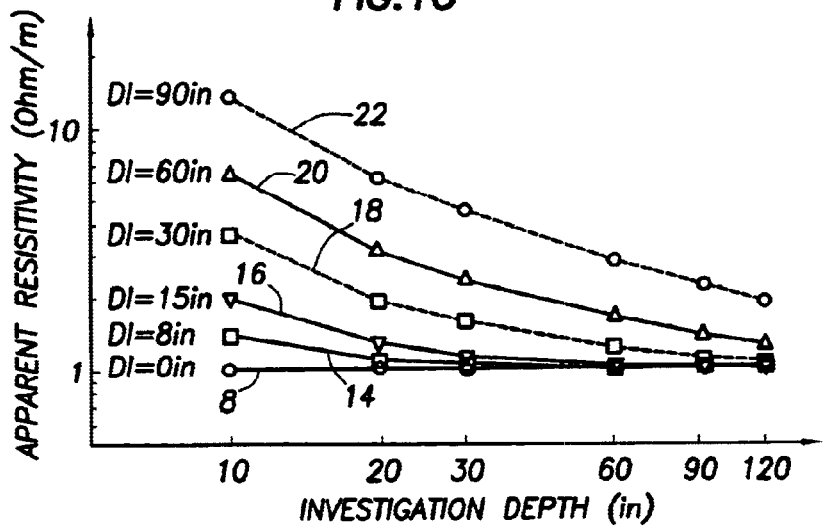
FIG. 2 illustrates the relationship between formation resistivity and invasion depth.

As previously set forth, quantitative pattern recognition ("QPR") generally refers to a quantitative categorization of data obtained by an extraction of the significant features or attributes of the data from a background of irrelevant detail. It has been discovered that, by application of the QPR processing techniques set forth herein to a series of measurements acquired using an HRAI or other array induction tool, the invasion depth DI, which was previously found to be, at best, weakly related to the amplitude of the measurements of resistivity typically acquired by the HRAI or other array induction tool, can now be better resolved using the very same series of measurements. A better understanding of this relationship may be obtained by reference to FIG. 2. FIG. 2 illustrates the relationship between formation resistivity $R_t$ and invasion depth DI. More specifically, for a formation having a true resistivity $R_t$ of 1 Ohm/m and an invasion zone resistivity $R_{xo}$ of 20 Ohms/m, plot 8 illustrates the apparent resistivity of the formation as a function of investigation depth for an invasion depth DI of 0 inches, plot 14 illustrates the apparent resistivity of the formation as a function of investigation depth for an invasion depth DI of 8 inches, plot 16 illustrates the apparent resistivity of the formation as a function of investigation depth for an invasion depth DI of 15 inches, plot 18 illustrates the apparent resistivity of the formation as a function of investigation depth for an invasion depth DI of 30 inches, plot 20 illustrates the apparent resistivity of the formation as a function of investigation depth for an invasion depth DI of 60 inches and plot 22 illustrates the apparent resistivity of the formation as a function of investigation depth for an invasion depth DI of 90 inches. In this regard, it will be useful to recall that the investigation depth relates to a measurement of the average radius of penetration of a subsurface geophysical formation by a signal generated by the array induction tool while the invasion depth relates to a measurement of the distance into the subsurface formation that the mud filtrate has penetrated.

As may be seen in FIG. 2, when there is no invasion of the subsurface geophysical formation by the mud filtrate, i.e., when the invasion depth DI=0, the apparent resistivity of the formation is essentially constant. As the invasion depth DI increases, however, the measurements of the resistivity of the formation at shallow investigation depths, for example, 10 inches, begin to increase relative to the measurements of the resistivity of the formation at deep investigation depths, for example, 120 inches. Furthermore, as the investigation depth increases, the increase in resistivity for the formation which results from an increase in the invasion depth DI decreases.

To describe the relationships illustrated generally in FIG. 2 in greater detail, the measurement data used to construct the plots 8*a*, 14, 16, 18, 20 and 22 must be applied to a multi-dimensional Euclidean space. More specifically, the measurements of the resistivity of the formation obtained using the HRAI or other array induction tool are expressed as a point in a measurement space. In this measurement space, the measurements of the resistivity are represented by a multi-element vector $\Omega_a$ which contains, for a given invasion depth DI, the apparent resistivity of the formation at investigation depths of 10 inches, 20 inches, 30 inches, 60 inches, 90 inches and 120 inches. The multi-element vector $\Omega_a$ may be expressed as:

$$\Omega_a = \{\sigma_a^1, \sigma_a^2, \sigma_a^3, \sigma_a^4, \sigma_a^5, \sigma_a^6\}; \quad (4)$$

The trend of the measurements forming the multi-element vector $\Omega_a$ can be extracted by constructing a pattern vector $\Psi$, corresponding to a point in a pattern space, which is defined as $$\Psi = \{\delta^1, \delta^2, \delta^3, \delta^4, \delta^5\}; \quad (5)$$

where:

$$\delta^i = \frac{\sigma_a^j - \sigma_a^{j+1}}{\sigma_a^1 - \sigma_a^6}. \quad (6)$$

It should be noted that plural pattern vectors, each of which adequately expresses a common pattern, exist and that the pattern defined in Equation (6) is but one specific pattern, specifically, a normalized difference pattern, which can be expressed by the pattern vector $\Psi$. It should be further noted that different constructions of the pattern vector will be required to solve other types of problems.

The validity of the pattern vector defined in Equation (6) may be readily established. As previously set forth, assuming that a radial 1-D inversion shall be used to solve for the conductivity of a subsurface geophysical formation and that the assumed profile for conductivity of the subsurface geophysical formation of interest is a step profile, as previously set forth in Equation (2), the $i^{th}$ one of the array induction measurements acquired by the HRAI or other array induction tools is expressed by the following:

$$\sigma_a^i = \sigma_{xo} * IRGF^i(DI) + \sigma_t * [1 - IRGF^i(DI)]. \quad (2)$$

From Equation (2), the difference between successive array induction measurements $\sigma_a^i$ and $\sigma_a^{i+1}$ is determined to be the following:

$$\sigma_a^j - \sigma_a^{j+1} = (\sigma_{xo} - \sigma_t) * [IRGF^i(DI) - IRGF^{i+1}(DI)]. \quad (7)$$

The right hand side of Equation (7) is the product of two terms, specifically, $(\sigma_{xo} - \sigma_t)$ and $[IRGF^i(DI) - IRGF^{i+1}(DI)]$. The first term, $(\sigma_{xo} - \sigma_t)$, bears no relationship to the invasion depth DI while the second term, $[IRGF^i(DI) - IRGF^{i+1}(DI)]$, is apparently independent of both true formation conductivity $\sigma_t$ and invasion zone conductivity $\sigma_{xo}$. Although the geometrical factors IRGF vary with background conductivity, once the background conductivity is estimated from the field measurements, the geometrical factors IRGF may be treated as a constant. Accordingly, from Equation (7), a pattern vector expressing the information regarding the invasion depth DI may be expressed as follows:

$$\frac{\sigma_a^j - \sigma_a^{j+1}}{\sigma_{xo} - \sigma_t} = IRGF^i(DI) - IRGF^{i+1}(DI). \quad (8)$$

Because the invasion conductivity $\sigma_{xo}$ and the true conductivity $\sigma_t$ for the subsurface geophysical formation of interest are unknown, the difference between the measurement of conductivity taken at the shallowest investigation depth and the measurement of conductivity taken at the deepest investigation depth may be used in place of $(\sigma_{xo} - \sigma_t)$, thereby yielding Equation (6):

$$\delta^i = \frac{\sigma_a^j - \sigma_a^{j+1}}{\sigma_a^1 - \sigma_a^6}; \quad (6)$$

which may also be represented as:

$$\delta^i = \frac{\sigma_a^j - \sigma_a^{j+1}}{\sigma_a^1 - \sigma_a^6} \propto [IRGF^i(DI) - IRGF^{i+1}(DI)]. \quad (9)$$

Of course, there may be ways to approximate $(\sigma_{xo} - \sigma_t)$ other than the aforementioned approximation used to derive Equation (6). It should be noted, however, that the pattern vector set forth in Equation (6) successfully extracts information regarding invasion depth DI while suppressing irrelevant background conductivity and is, therefore, suitable for the purposes contemplated herein. It should be further noted that plural pattern vectors, each of which adequately expresses a common pattern, are suitable for use in conjunction with QPR inversion techniques such as those disclosed herein and that the pattern defined in Equation (6) is but one specific pattern, specifically, a normalized difference pattern, which can be expressed by the pattern vector Ψ. Finally, it should be noted that constructions of the pattern vector different from the construction of the pattern vector disclosed herein will be required to solve other types of problems.

Having constructed the pattern vector Ψ, information related to the invasion depth DI may be extracted by the transformation of the invasion depth DI from the measurement space to the pattern space. More specifically, unlike the measurement space, where the invasion depth DI could only be poorly resolved, in the pattern space, not only does the invasion depth DI becomes well-resolvable, it may even be separable from the model parameters, $\sigma_t$ and $\sigma_{xo}$. Once in the pattern space, the inversion technique may again be applied. Unlike the measurement space, however, in the pattern space, because the invasion depth DI is now resolvable, the object function is no considered to be a misfit function. Instead, the object function resultant from an inversion in he pattern space, which hereafter will be referred to as a QPR object function $O_{QPR}$, represents a Euclidean distance. Thus, the misfit object function, which, in measurement space, was represented as follows:

$$O_{mis}(DI, \sigma_t, \sigma_{xo}) = \sum_i^N w_i \|\sigma_{am}^i - \sigma_a^i(DI, \sigma_t, \sigma_{xo})\|^p + regularization; \quad (3)$$

becomes, in pattern space, a QPR object function which is represented as follows:

$$O_{qpr}(DI, \sigma_t, \sigma_{xo}) = \sum_i^N w_i \|\delta_m^i - \delta_c^i(DI, \sigma_t, \sigma_{xo})\|^p + regularization; \quad (10)$$

where:

M is the number of elements in the pattern vector;

$\delta_m^i$ is the $i^{th}$ element of the pattern vector constructed from the field measurements; and $\delta_c^i$ is the $i^{th}$ element of the pattern vector constructed from the numerically forward-computed measurements.

Figure 3:
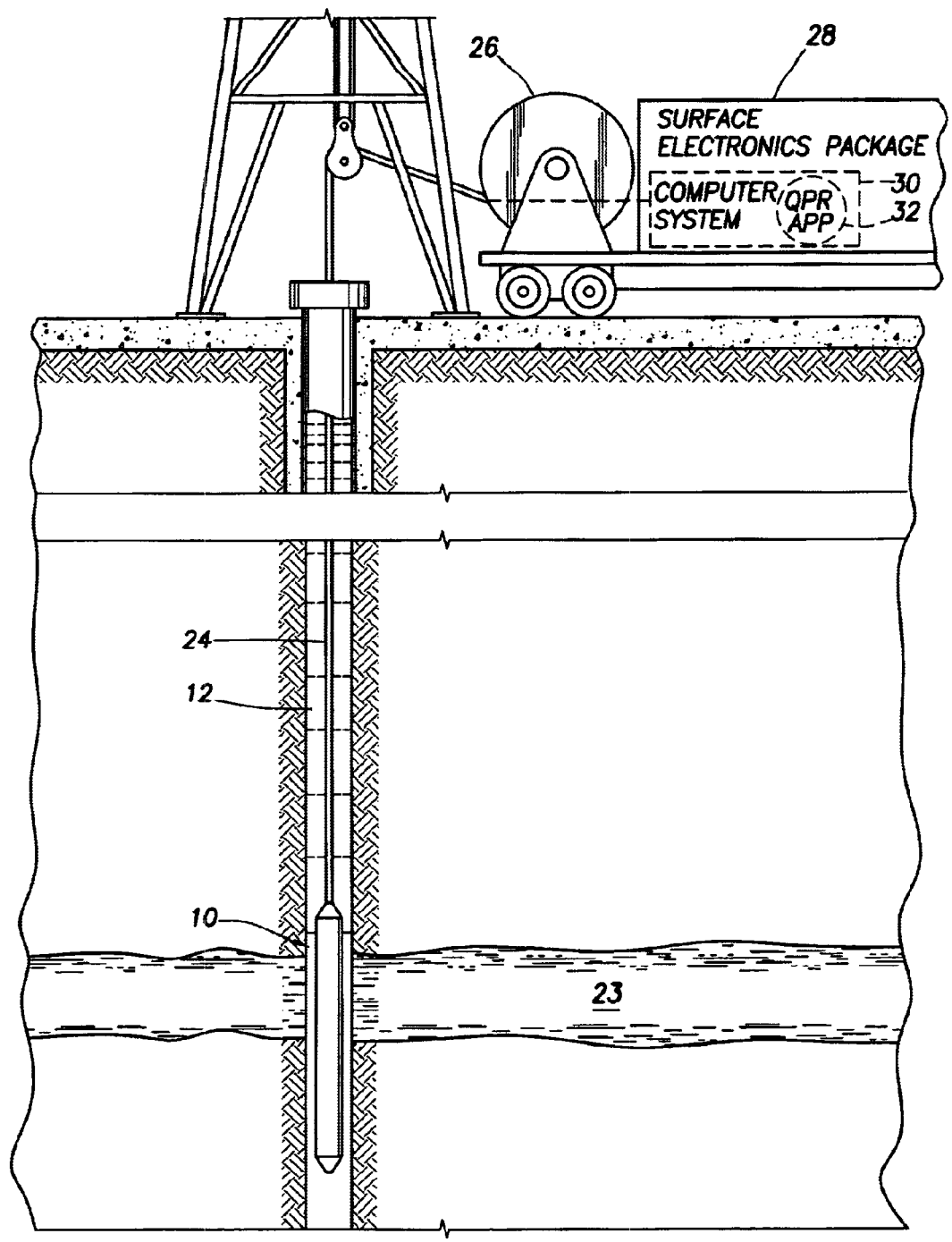
FIG. 3 illustrates an array induction tool disposed in a wellbore penetrating various subsurface formations.

Turning now to FIG. 3, an array induction tool 10, for example, an HRAI tool, disposed in a wellbore 12 penetrating a subsurface geophysical formation, specifically, subsurface formation 23, may now been seen. Typically, the array induction tool 10 is lowered into the wellbore 12 at one end of an armored electrical cable 24 by means of a winch 26 or similar device known in the art. The aforementioned U.S. Pat. No. 6,597,993 to Strickland et al. discloses a HRAI tool suitably configured for generating appropriate induction signals and acquiring an array induction log for the subsurface geophysical formation 23 for subsequent processing in accordance with the techniques disclosed herein. It should be clearly understood, however, that the HRAI tool disclosed in Strickland et al. is not an exclusive representation of those well logging instruments capable of generating suitable induction signals and should not, therefore, limit the scope of the present invention.

Data acquired by the array induction tool 10 is transmitted along the cable 24 to a surface electronics package 28. The surface electronics package 28 may include any number of devices suitable for use in the acquisition and/or processing of data acquired by the array induction tool 10. For example, the surface electronics package 28 includes a logging tool (not shown) for recording, as one or more conductivity logs, conductivity data acquired by the array induction tool 10. The surface electronics package 28 further includes a computer system 30 coupled to receive the data acquired by the array induction tool 10 and transmitted to the surface electronics package 28 via the cable 24. Residing on the computer system 30 is a QPR inversion processing software module 32. As will be more fully described below, the QPR inversion processing software module 32 determines formation conductivity $\sigma_t$ and invasion zone conductivity $\sigma_{xo}$ from the conductivity data acquired by the array induction tool 10. The QPR inversion processing software module 32 is stored in a memory subsystem (not shown) of the computer system 30 and is executable by a processor subsystem (also not shown) of the computer system 30. As disclosed and illustrated herein, the QPR inversion processing software module 32 forms all or part of a software application which resides on the computer system 30 and is comprised of one or more lines of code executable by the processor subsystem. While it is contemplated that QPR inversion processing software module 32 will typically be stored in an auxiliary memory, for example, a hard drive, coupled to a system bus of the computer system 30, if desired, the QPR inversion processing software module 32 may be stored on a portable media, for example, one or more floppy disks, or on a second computer system coupled to the computer system 30 by a data network (also not shown), for example, a private local area network ("LAN"), a private wide area network ("WAN") or a public data network such as the Internet. Finally, while FIG. 1 shows the computer system 30 and the QPR inversion processing software module 32 residing thereon as physically located at the site of the wellbore 12, it is contemplated that, if desired, the subsurface electronics package 28 may be used merely to acquire the conductivity data while processing of the acquired conductivity data using the QPR inversion processing software module is performed at a remote location, for example, a home or field office of the person or business entity conducting exploration operations using the wellbore 12.

Figure 4:
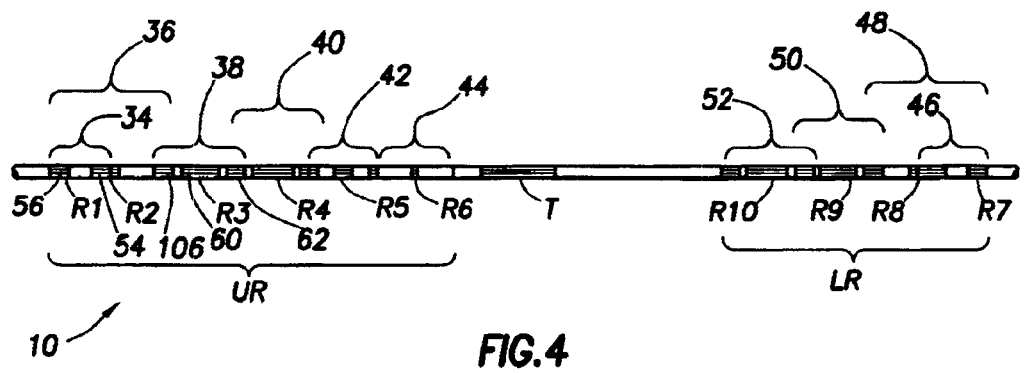
FIG. 4 is a schematic diagram of the array induction tool of FIG. 3.

Turning next to FIG. 4, the array induction tool 10 will now be described in greater detail. In FIG. 4, each shaded rectangular block represents a coil and, if a line is drawn through the shaded area of the rectangular block, the coil is a tapped coil. The rectangular block bearing the label "T" represents the transmitter coil, the rectangular blocks bearing the labels "R1" through "R6" represent the six receiver coils arranged into the upper receiver ("UR") coil sets and the rectangular blocks bearing the labels "R7" through "R10" represent the four receiver coils arranged into the lower receiver ("LR") coil sets. Thus, as shown in FIG. 4, a preferred embodiment of the array induction tool 10 includes six upper receiver coil sets, specifically, receiver coil sets 34, 36, 38, 40, 42 and 44 and four lower receiver coil sets, specifically, receiver coil sets 46, 48, 50 and 52.

As further illustrated in FIG. 4, for each receiver coil set, the main receiver coil is bracketed with its bucking receiver coil(s). Within the upper receiver coil sets 34 through 44, it is preferred that the deepest three-receiver set 36 has a 72 inch spacing to main receiver coil 54 and a 9 inch spacing to bucking receiver coils 56 and 58. The bucking receiver coil 56 on the end of the deepest three-receiver set 36 is also the main receiver for the deepest two-receiver coil set 34. A tapped portion of the main receiver coil 54 of the three-receiver coil set 36 can be used as the bucking receiver coil for the deepest, two-receiver coil set 34. Preferably, the deepest two-receiver coil set 34 has a depth of investigation of about 120 inches. The next shallowest three-receiver coil set 38 shares a bucking receiver coil 58 with the deepest three-receiver coil set 36. Since sensitivity is less of a problem with shallower spacings, to improve the vertical resolution of the three-receiver coil sets 38, 40, 42 and 44, the spacing from the main receiver to the bucking receiver coils, for example, the spacing from main receiver coil 60 to the bucking receiver coils 58 and 62, is decreased to six inches. As a result, the three-receiver coil sets 38, 40, 42 and 44 have approximately the same sensitivity. The remaining receiver coil sets also use a spacing of six inches between the main receiver coil and the bucking receiver coils spacing and share all or a portion of the bucking receiver coils of the nearest neighbor receiver coil set. The lower receiver coil sets 46, 48, 50, 52 are preferably mirrors of the upper receiver coil sets 34, 36, 38 40, respectively. The two shallowest upper receiver coil sets 42 and 44 are not mirrored in the lower coils sets, although in an alternate embodiment, the receiver coil sets of the array induction tool 10 could be arranged into a fully symmetric configuration Referring next to FIG. 5, a first plot 64 of a set of forward-computed measurements of the apparent resistivity of the subsurface geophysical formation 23 as a function of investigation depth may now be seen. As may be seen in FIG. 5, the first plot 64 is comprised of measurements of resistivity of the subsurface geophysical formation 23 at investigation depths of 10, 20, 30, 60, 90 and 120 inches. Here, the subsurface geophysical formation 23 being investigated is presumed to be a radial 1-D formation having a true formation resistivity $R_t$ equal to 100 Ohm, an invasion zone resistivity $R_{xo}$ equal to 2 Ohm and an invasion depth of 47 inches. Setting the regularization to zero and the weighting factor $w_i$ to one, the misfit object function $O_{mis}$ defined by Equation (3) and the QPR object function $O_{QPR}$ defined by Equation (10) may now be determined from the data set forming the first plot 64.

Figure 5:
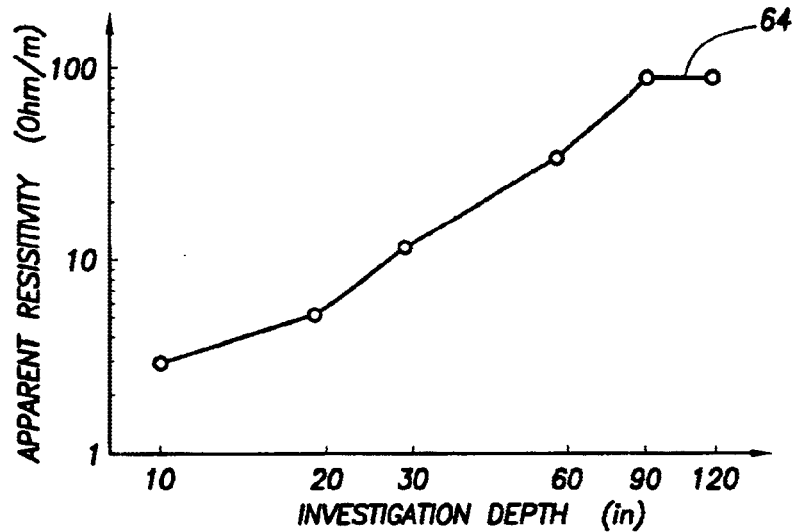
FIG. 5 is a plot of a first set of field measurements of a subsurface formation acquired using the array induction tool of FIG. 4.
Figure 6:
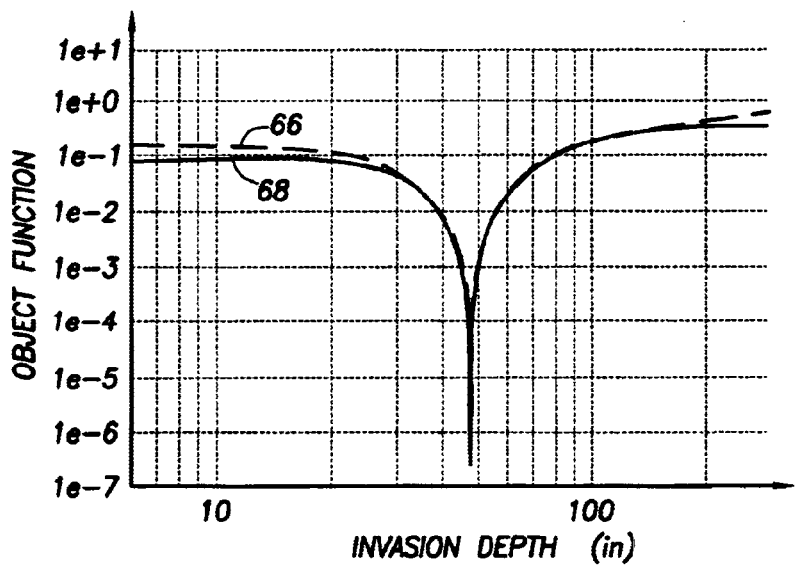
FIG. 6 is a plot of a misfit object function $O_{mis}$ and a quantitative pattern recognition ("QPR") object function $O_{QPR}$ calculated, from the data set plotted in FIG. 5, using true values for formation resistivity $R_t$ and invasion zone resistivity $R_{xo}$.

Referring next to FIG. 6, misfit object function $O_{mis}$ 66 and QPR object function $O_{QPR}$ 68 determined, using Equation (3) and Equation (10), respectively, from the data set forming the first plot 64 of FIG. 5 may now be seen. As clearly illustrated in FIG. 6, both the misfit object function $O_{mis}$ 66 and the QPR object function $O_{QPR}$ 68 have minimum points at an invasion depth DI of 47 inches. In calculating the misfit object function $O_{mis}$ 66 and the QPR object function $O_{QPR}$ 68, the estimate of the true formation resistivity $R_{t\_estimate}$ was set to 100 Ohm, the value of true formation resistivity $R_t$ and the estimate of invasion zone resistivity $R_{xo\_estimate}$ was set to 2 Ohm, the value of true invasion resistivity $R_{xo}$.

Figure 7:
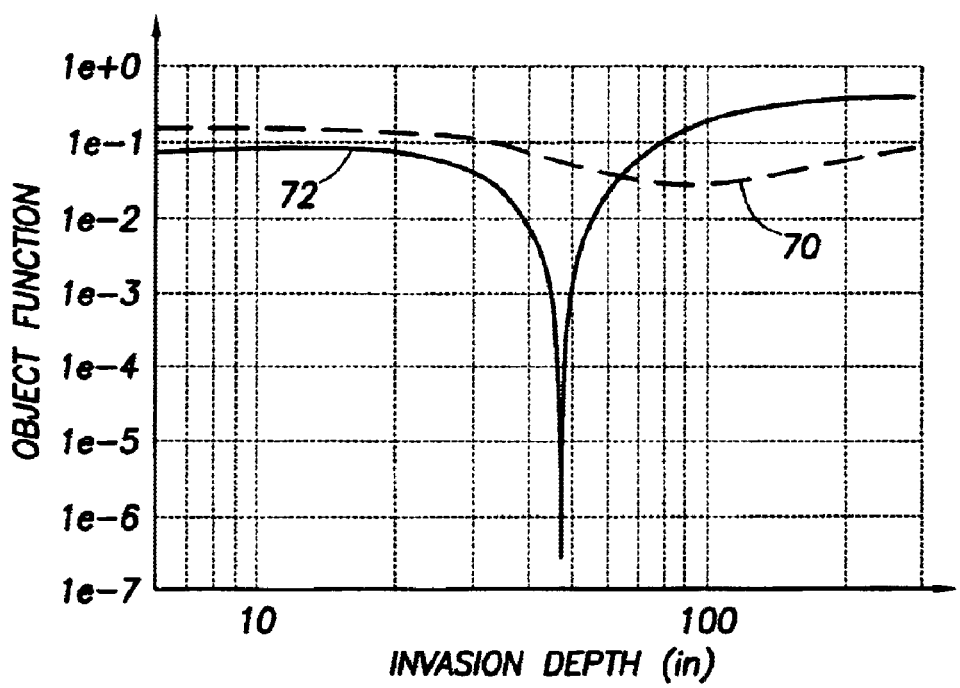
FIG. 7 is a plot of a misfit object function $O_{mis}$ and a QPR object function $O_{QPR}$ calculated, from the data set plotted in FIG. 5, using a true value for formation resistivity $R_t$ and an off-true value for invasion zone resistivity $R_{xo}$.

Referring next to FIG. 7, misfit object function $O_{mis}$ 70 and QPR object function $O_{QPR}$ 72, again determined using Equation (3) and Equation (10), respectively, from the data set forming the first plot 64 of FIG. 5 may now be seen. As clearly illustrated in FIG. 7, the misfit object function $O_{mis}$ shows a minimum point at an invasion depth DI of about 85 inches while the QPR object function $O_{QPR}$ indicates an invasion depth DI of 47 inches. In these calculations of the misfit object function $O_{mis}$ and the QPR object function $O_{QPR}$, the estimate of the true formation resistivity $R_{t\_estimate}$ was again set to 100 Ohms, the value of the true formation resistivity $R_t$. However, in contrast to the prior calculations of the misfit object function $O_{mis}$ and the QPR object function $O_{QPR}$ using the 2 Ohm true value of invasion zone resistivity $R_{xo}$, in this calculation of the misfit object function $O_{mis}$ and the QPR object function $O_{QPR}$, the estimate of invasion zone resistivity $R_{xo\_estimate}$ was set to 5 Ohms. Thus, FIG. 7 shows that, when a value off the true value is chosen for invasion zone resistivity, the misfit object function $O_{mis}$ no longer points to the correct value of invasion depth DI. In contrast, however, the QPR object function $O_{QPR}$ will still point to the correct value of the invasion depth DI.

Figure 8:
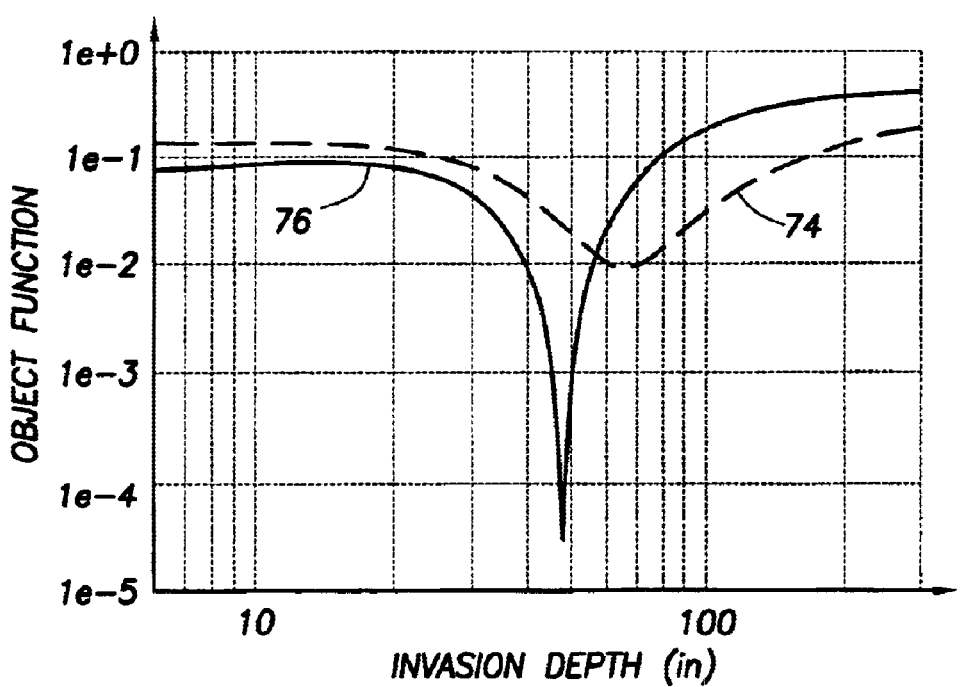
FIG. 8 is a plot of a misfit object function $O_{mis}$ and a QPR object function $O_{QPR}$ calculated, from the data set plotted in FIG. 5, using off-true values for both formation resistivity $R_t$ and invasion zone resistivity $R_{xo}$.

Referring next to FIG. 8, misfit object function $O_{mis}$ 74 and QPR object function $O_{QPR}$ 76, again determined using Equation (3) and Equation (10), respectively, from the data set forming the first plot 64 of FIG. 5 may now be seen. As clearly illustrated in FIG. 8, the misfit object function $O_{mis}$ shows a minimum point at an invasion depth DI of about 65 inches while the QPR object function $O_{QPR}$ indicates an invasion depth DI of 47 inches. In these calculations of the misfit object function $O_{mis}$ and the QPR object function $O_{QPR}$, the estimate of the true formation resistivity $R_{t\_estimate}$ and the invasion zone resistivity $R_{xo\_estimate}$ were selected off true value. More specifically, rather than using the true formation resistivity $R_t$ of 100 Ohms, $R_{t\_estimate}$ was set to 50 Ohms. Similarly, rather than using the true invasion zone resistivity $R_{xo}$ of 2 Ohms, $R_{xo\_estimate}$ was set to 3 Ohms. Thus, FIG. 8, shows that, when values off the true values are chosen for both formation resistivity and invasion zone resistivity, the misfit object function $O_{mis}$ no longer points to the correct value of invasion depth DI. In contrast, however, the QPR object function $O_{QPR}$ will still point to the correct value of the invasion depth DI.

Figure 9:
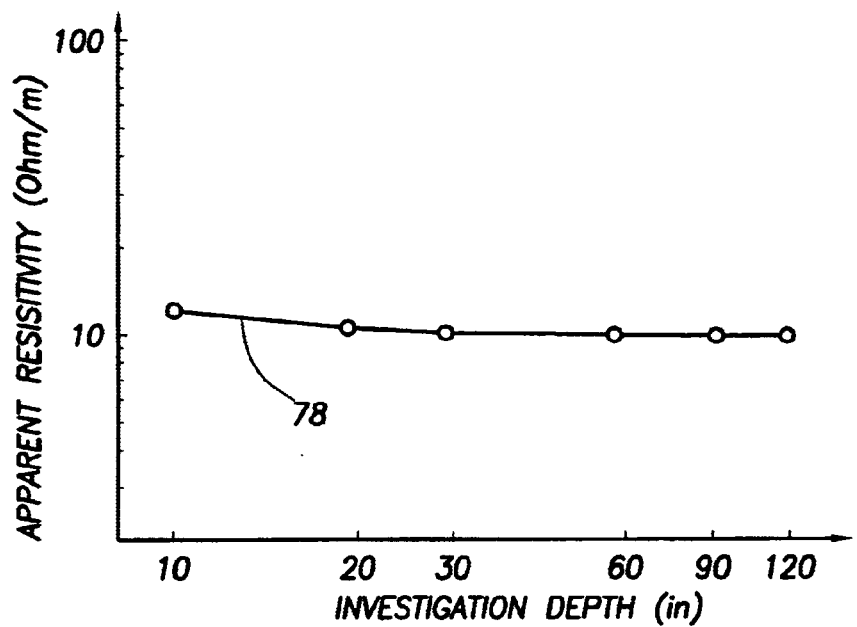
FIG. 9 is a plot of a second set of field measurements of a subsurface formation acquired using the array induction tool of FIG. 4.

Referring next to FIG. 9, a second plot 78 of forward-computed measurements of the apparent resistivity of the subsurface geophysical formation 23 as a function of investigation depth may now be seen. As may be seen in FIG. 9, the second plot 78 is again comprised of measurements of resistivity of the subsurface geophysical formation 23 at investigation depths of 10, 20, 30, 60, 90 and 120 inches. Here, however, the subsurface geophysical formation 23 is presumed to be a radial 1D formation having a true formation resistivity $R_t$ equal to 10 Ohm, a true invasion zone resistivity $R_{xo}$ equal to 20 Ohm and an invasion depth of 30 inches. Again setting the regularization to zero and the weighting factor $w_i$ to one, the misfit object function $O_{mis}$ defined by Equation (3) and the QPR object function $O_{QPR}$ defined by Equation (10) may again be determined, in this case, from the data set forming the second plot 78.

Figure 10:
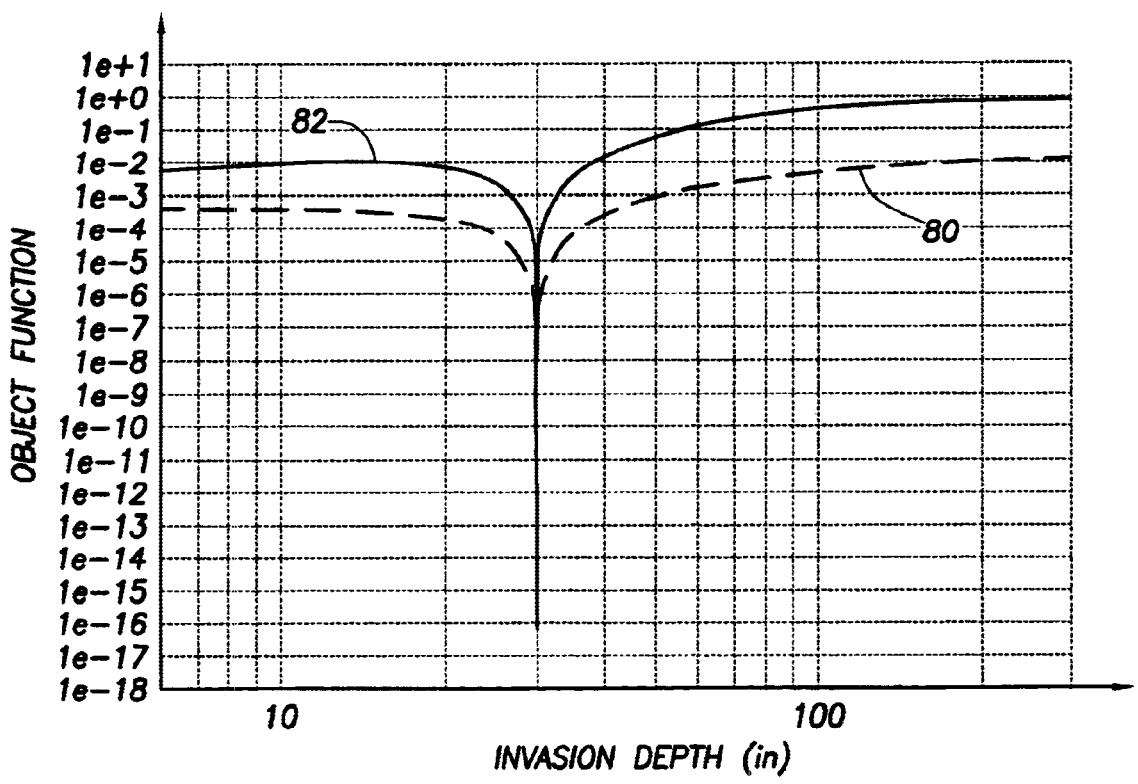
FIG. 10 is a plot of a misfit object function $O_{mis}$ and a QPR object function $O_{QPR}$ calculated, from the data set plotted in FIG. 9, using true values for formation resistivity $R_t$ and invasion zone resistivity $R_{xo}$.

Referring next to FIG. 10, misfit object function $O_{mis}$ 80 and QPR object function $O_{QPR}$ 82 determined, using Equation (3) and Equation (10), respectively, from the data set forming the second plot 78 of FIG. 9 may now be seen. As clearly illustrated in FIG. 10, both the misfit object function $O_{mis}$ 80 and the QPR object function $O_{QPR}$ 82 have minimum points at an invasion depth DI of 30 inches. In calculating the misfit object function $O_{mis}$ 80 and the QPR object function $O_{QPR}$ 82, the estimate of the true formation resistivity $R_{t\_estimate}$ was set to 10 Ohms, the value of true formation resistivity $R_t$ and the estimate of invasion zone resistivity $R_{xo\_estimate}$ was set to 20 Ohms, the value of true invasion resistivity $R_{xo}$.

Figure 11:
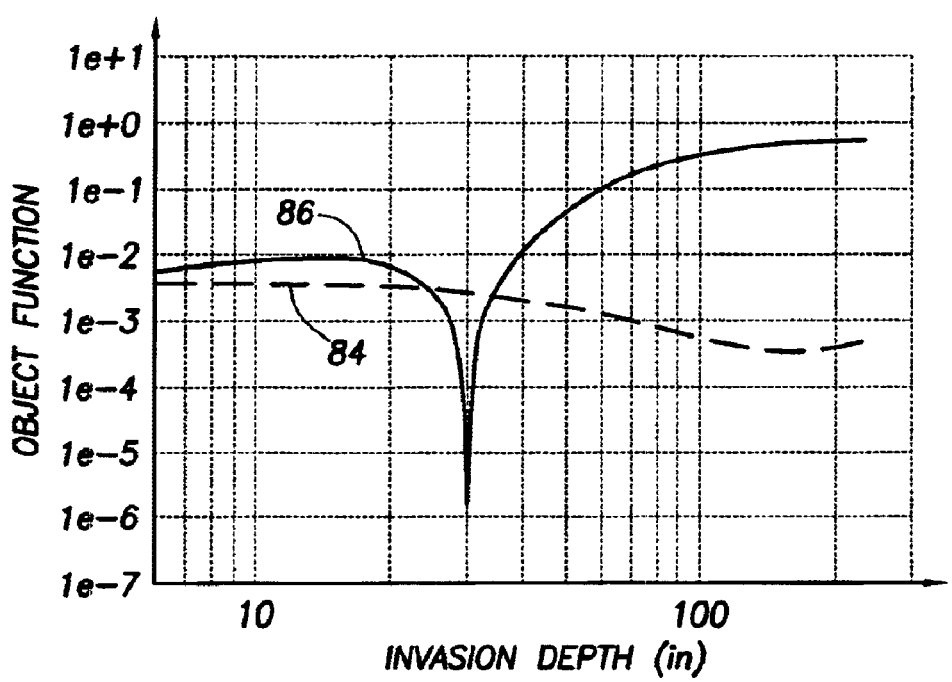
FIG. 11 is a plot of a misfit object function $O_{mis}$ and a QPR object function $O_{QPR}$ calculated, from the data set plotted in FIG. 9, using a first set of off-true values for formation resistivity $R_t$ and invasion zone resistivity $R_{xo}$.

Referring next to FIG. 11, misfit object function $O_{mis}$ 84 and QPR object function $O_{QPR}$ 86, again determined using Equation (3) and Equation (10), respectively, from the data set forming the second plot 78 of FIG. 9 may now be seen. As clearly illustrated in FIG. 1, the misfit object function $O_{mis}$ no longer points to an invasion depth DI. In contrast, the QPR object function $O_{QPR}$ again indicates an invasion depth DI of 30 inches. In these calculations of the misfit object function $O_{mis}$ and the QPR object function $O_{QPR}$, the estimate of the true formation resistivity $R_{t\_estimate}$ and the invasion zone resistivity $R_{xo\_estimate}$ were selected off true value. More specifically, rather than using the true formation resistivity $R_t$ of 10 Ohms, $R_{t\_estimate}$ was set to 8.3 Ohms. Similarly, rather than using the true invasion zone resistivity $R_{xo}$ of 20 Ohms, $R_{xo\_estimate}$ was set to 12.5 Ohms. Thus, FIG. 1, shows that, when values off the true values are chosen for both formation resistivity and invasion zone resistivity, the misfit object function $O_{mis}$ will no longer clearly point to a value for the invasion depth DI. In contrast, however, the QPR object function $O_{QPR}$ will still point to the correct value of the invasion depth DI. In this example, the estimates for formation resistivity $R_{t\_estimate}$ and invasion zone resistivity $R_{xo\_estimate}$ were off the true values by relatively small amounts. More specifically, the estimate for formation resistivity was $$\left[100\left[\frac{|e(8.3) - e(10)|}{e(10)}\right]\right]$$

(or about 82%) of the true formation resistivity while the estimate for the invasion zone resistivity was $$\left[100\left[\frac{|e(12.5) - e(20)|}{e(20)}\right]\right]$$

(or about 99.9%) of the true invasion zone resistivity.

Figure 12:
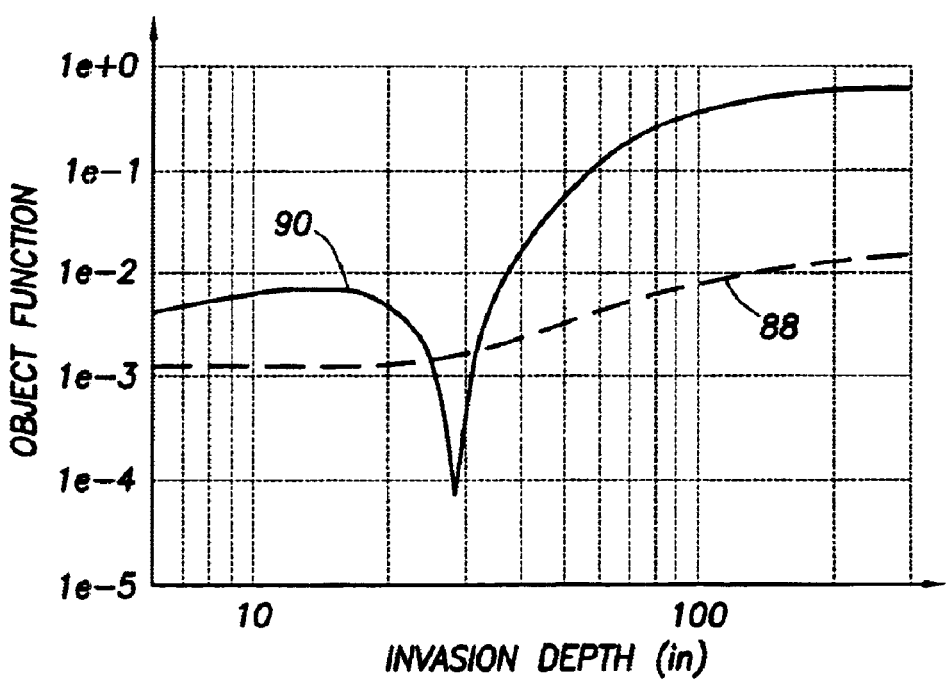
FIG. 12 is a plot of a misfit object function $O_{mis}$ and a QPR object function $O_{QPR}$ calculated, from the data set plotted in FIG. 9, using a second set of off-true values for formation resistivity $R_t$ and invasion zone resistivity $R_{xo}$.

Referring next to FIG. 12, misfit object function $O_{mis}$ 88 and QPR object function $O_{QPR}$ 90, again determined using Equation (3) and Equation (10), respectively, from the data set forming the second plot 78 of FIG. 9 may now be seen. As clearly illustrated in FIG. 12, the misfit object function $O_{mis}$ 88 again fails to point to an invasion depth DI. In contrast, the QPR object function $O_{QPR}$ 90 indicates an invasion depth DI of about 29 inches. In these calculations of the misfit object function $O_{mis}$ 88 and the QPR object function $O_{QPR}$ 90, the estimate of the true formation resistivity $R_{t\_estimate}$ and the invasion zone resistivity $R_{xo\_estimate}$ were again selected to be off true value. Here, however, rather than using the true formation resistivity $R_t$ of 10 Ohms, $R_{t\_estimate}$ was set to 12 Ohm. Similarly, rather than using the true invasion zone resistivity $R_{xo}$ of 20 Ohms, $R_{xo\_estimate}$ was set to 25 Ohms. Thus, FIG. 12 shows that, when values off the true values are chosen for both formation resistivity and invasion zone resistivity, the misfit object function $O_{mis}$ 88 will no longer clearly point to a value for the invasion depth DI. In contrast, however, the QPR object function $O_{QPR}$ 90 will still point to the value very close to the actual value of the invasion depth DI. In this example, the estimates for formation resistivity $R_{t\_estimate}$ and invasion zone resistivity $R_{xo\_estimate}$ were off the true values by relatively large amounts. More specifically, the estimate for the true formation resistivity was $$\left[100\left[\frac{|e(12) - e(10)|}{e(10)}\right]\right]$$

(or about 639%) of the true formation resistivity while the estimate for the invasion zone resistivity was $$\left[100\left[\frac{|e(25) - e(20)|}{e(20)}\right]\right]$$

(or about 14,741%) of the true invasion zone resistivity.

Further useful information may be derived from a comparison of the misfit and QPR object functions $O_{mis}$ and $O_{QPR}$ 84 and 86 illustrated in FIG. 11 to the misfit and QPR object functions $O_{mis}$ and $O_{QPR}$ 88 and 90 illustrated in FIG. 12. More specifically, while the misfit functions $O_{mis}$ 84 and 88 both fail to clearly point to a value for the invasion depth DI, regardless of the extent of the error which occurs while estimating Rt and Rxo, in determining the invasion depth DI, the QPR object functions $O_{QPR}$ 86 and 90 did not vary greatly, even when the estimates of Rt and Rxo were quite far off the true values therefor. Accordingly, one may properly conclude that use of the QPR object function $O_{QPR}$ is advantageous relative to use of the misfit object function $O_{mis}$. For example, even when the estimates of the true resistivity $R_t$ and the invasion zone resistivity $R_{xo}$ bore little similarity to the actual values of the true resistivity $R_t$ and the invasion zone resistivity $R_{xo}$, the value for the invasion depth DI which may be calculated from the QPR object function $O_{QPR}$ remained quite close to the actual value for the invasion depth DI.

A number of other observations may be made when one compares the misfit object functions $O_{mis}$ illustrated in FIGS. 6–8 and 10–12 to the corresponding QPR object functions $O_{QPR}$ illustrated in those same figures. More specifically, the foregoing comparisons of the misfit object functions $O_{mis}$ to the corresponding QPR object functions $O_{QPR}$ illustrate that, when the misfit object function $O_{mis}$ is used, an error in the determination of formation conductivity $\sigma_t$ and/or invasion zone conductivity $\sigma_{xo}$ will propagate into the solution for invasion depth DI determined using the misfit object function $O_{mis}$. In return, an error in the solution of the invasion depth DI will propagate into the solution for formation conductivity $\sigma_t$ and invasion zone conductivity $\sigma_{xo}$. Because of the strong interaction between the solutions of the model parameters $\sigma_t$, $\sigma_{xo}$ and DI, when the misfit object function $O_{mis}$ is used, all of the model parameters must be solved simultaneously. Furthermore, when the initial estimates of the model parameters $\sigma_t$, $\sigma_{xo}$ and DI are improperly chosen, the iterative procedure typically used to optimize the solution for the model parameters $\sigma_t$, $\sigma_{xo}$ and DI may instead produce divergent results. In contrast with the foregoing, when the QPR object function $O_{QPR}$ is used, the solution of the invasion depth DI is relatively independent of the determination of formation conductivity $\sigma_t$ and invasion zone conductivity $\sigma_{xo}$. As a result, the solution for invasion depth DI may be determined independent of the solution for formation conductivity $\sigma_t$ and invasion zone conductivity $\sigma_{xo}$. Indeed, Equation (2), above, establishes that, once the invasion depth DI is known, the relationship between the measurements acquired using the array induction tool 10 and the invasion zone conductivity $\sigma_{xo}$ becomes linear. Accordingly, both the formation conductivity $\sigma_t$ and the invasion zone conductivity $\sigma_{xo}$ may be determined by solving a linear equation.

Figure 13:
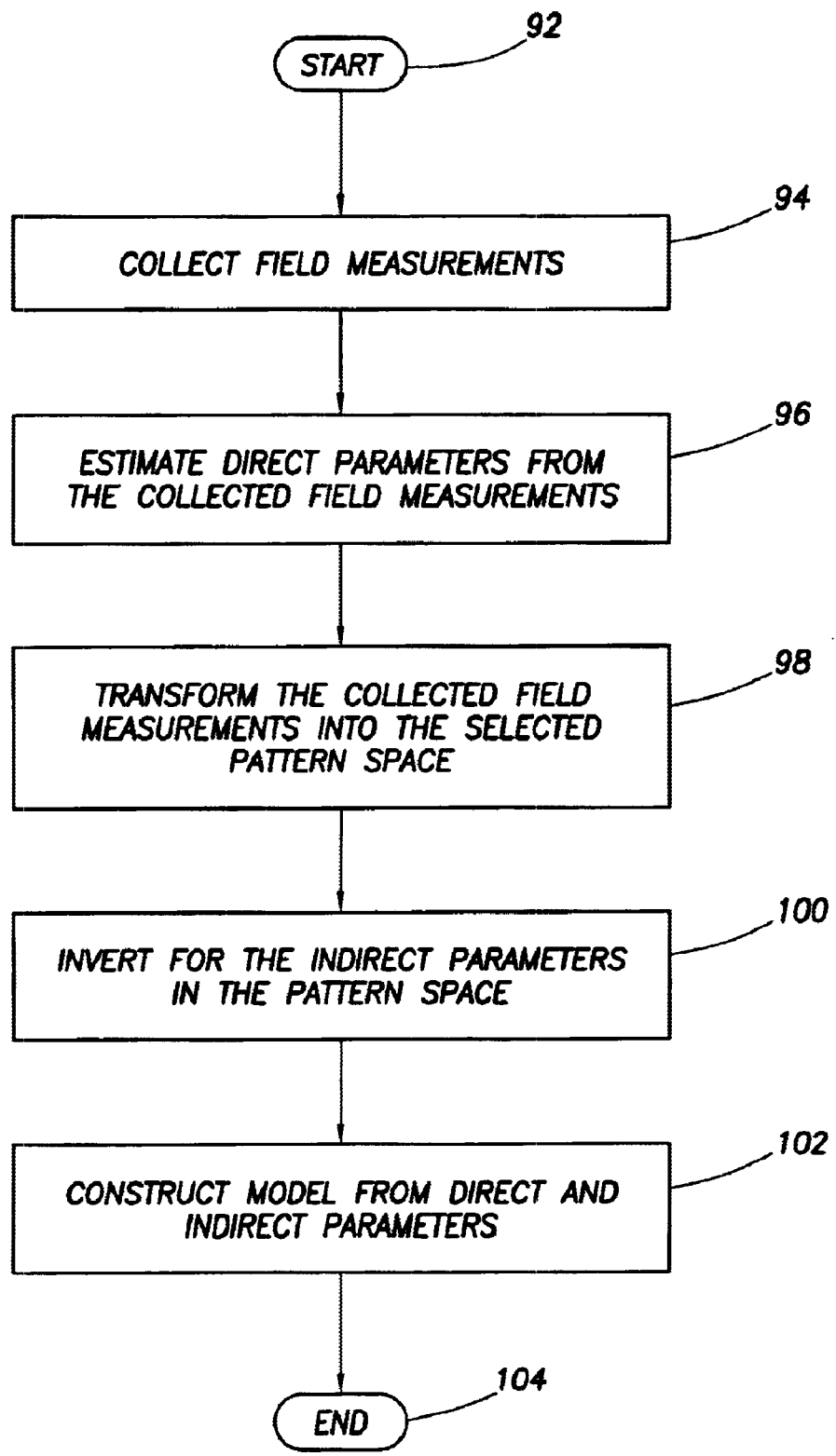
FIG. 13 is a flowchart of a method of constructing a data model using information derived during inversion processing of acquired data in a selected pattern space.

Referring next to FIG. 13, a method of constructing a data model, defined by a plurality of model parameters, using a QPR inversion technique will now be described in greater detail. As previously set forth, a data model may be defined by a mathematical relationship between a plurality of model parameters. In accordance with the data model defined herein, a first subset comprised of at least one of the plurality of model parameters are directly related to the data model while a second subset comprised of at least one of the plurality of model parameters are indirectly related to the data model. The method of constructing a data model commences at step 92 and, at step 94, a set of field measurements from which the data model is to be constructed are collected using a data acquisition device.

Continuing on to step 96, as the first subset of model parameters are directly related to the data model, values for the first (or "directly-related") subset of model parameters may be estimated from the collected field measurements. In an alternative embodiment not illustrated in FIG. 13, conventional inversion techniques may be used to more precisely determine estimates of the values of the directly-related subset of model parameters. More specifically, the initial estimates of the directly-related subset of model parameters are used to construct a first simulated response for the data acquisition tool. If the simulated response matches the collected field data within the range of uncertainty for the data acquisition tool, the estimated values for the directly-related subset of model parameters shall be used in construction of the data model. If, however, the two sets of responses do not match, the estimates of the directly-related subset of model parameters are adjusted and a subsequent simulated response for the data acquisition tool is constructed. The process is repeated until the simulated response matches the collected field data.

After estimating the directly-related subset of model parameters for the data model at step 96, the method proceeds to step 98 where the collected field measurements $\Omega_a$, where $\Omega_a = \{\sigma_a^1, \sigma_a^2, \sigma_a^3, \sigma_a^4, \sigma_a^5, \sigma_a^6\}$ are defined by the equation:

$$\Psi = \{\delta^1, \delta^2, \delta^3, \delta^4, \delta^5\}$$

where $$\delta^i = \frac{\sigma_a^i - \sigma_a^{i+1}}{\sigma_a^1 - \sigma_a^6}.$$

After transforming the collected field measurements into the selected pattern space, the method proceeds to step 100 for determination of the second (or "indirectly-related") subset of model parameters using an inversion process. In an inversion process in the pattern space, initial values for the indirectly-related subset of model parameters are determined by applying the quantitative pattern recognition object function $O_{QPR}$ set forth in Equation (10) to the elements of the pattern vector $\Psi$. The values of the indirectly-related subset of model parameters are subsequently used to construct a first simulated response for the data acquisition tool. If the first simulated response for the data acquisition tool does not match the collected field data within the range of uncertainty for the data acquisition tool, the values of the indirectly-related subset of model parameters are adjusted and a subsequent simulated response for the data acquisition tool is constructed. The process is then repeated until the simulated response matches the collected field data.

Upon determining the indirectly-related subset of model parameters at step 100, the method proceeds to step 102 where a data model is constructed using the directly-related subset of model parameters estimated at step 96 (or, in the alternative, determined by an inversion of the collected field measurements in the measurement space) and the indirectly-related subset of model parameters determined by an inversion of the collected field measurements in the pattern space at step 100. The method will then end at step 104.

Figure 14:
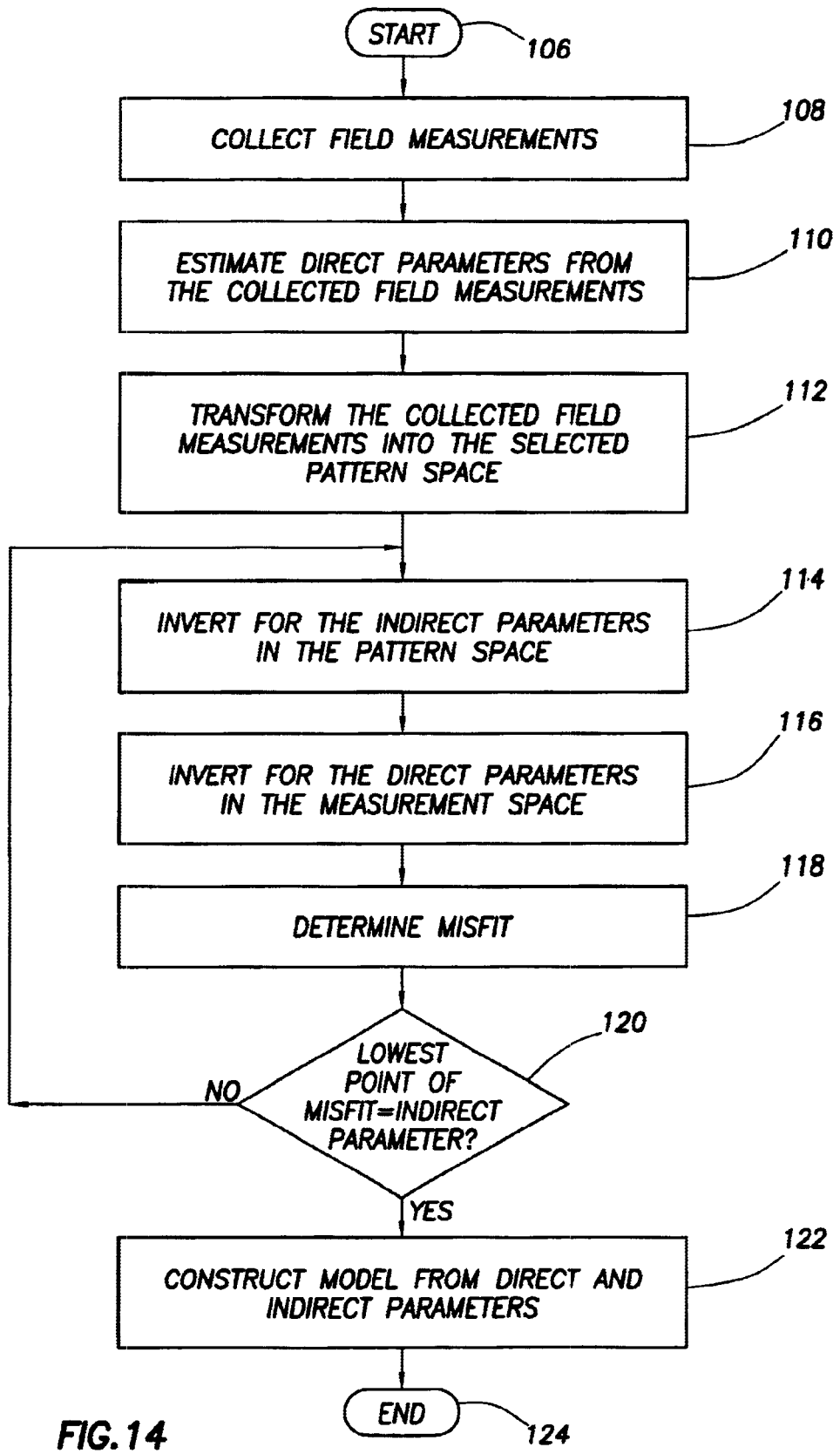
FIG. 14 is a flowchart of a method of constructing a data model by combining information derived during inversion processing of acquired data in measurement space with information derived during inversion processing of the acquired data in a selected pattern space.

Referring next to FIG. 14, a method of constructing a data model using a technique which hybridizes the QPR inversion technique of FIG. 13 with conventional inversion techniques will now be described in greater detail. As before, the data model to be constructed is defined by a mathematical relationship between a plurality of model parameters, a first subset of which are directly related to the data model and a second subset of which are indirectly related to the data model. Construction of the data model commences at step 106 and, at step 108, a set of field measurements from which the data model is to be constructed are collected using a data acquisition device. Continuing on to step 110, as the first subset of model parameters are directly related to the data model, values for the first (or "directly-related") subset of model parameters may be estimated from the collected field measurements.

After estimating the directly-related subset of model parameters for the data model at step 110, the method proceeds to step 112 where the collected field measurements $\Omega_a$, where $\Omega_a = \{\sigma_a^1, \sigma_a^2, \sigma_a^3, \sigma_a^4, \sigma_a^5, \sigma_a^6\}$, are transformed into a selected pattern space, here, again, a pattern space defined by the equation:

$$\Psi = \{\delta^1, \delta^2, \delta^3, \delta^4, \delta^5\}$$

where $$\delta^i = \frac{\sigma_a^i - \sigma_a^{i+1}}{\sigma_a^1 - \sigma_a^6}.$$

After transforming the collected field measurements into the selected pattern space, the method proceeds to step 114 for determination of the second (or "indirectly-related") subset of model parameters using an inversion process. As before, in an inversion process in the pattern space, initial values for the indirectly-related subset of model parameters are determined by applying the quantitative pattern recognition object function $O_{QPR}$ set forth in Equation (10) to the elements of the pattern vector $\Psi$. The values of the indirectly-related subset of model parameters are subsequently used to construct a first simulated response for the data acquisition tool. If the first simulated response for the data acquisition tool does not match the collected field data within the range of uncertainty for the data acquisition tool, the values of the indirectly-related subset of model parameters are adjusted and a subsequent simulated response for the data acquisition tool is constructed. The process is then repeated until the simulated response matches the collected field data.

Upon determining the indirectly-related subset of model parameters at step 114, the method proceeds to step 116 where the directly-related subset of model parameters are determined from an inversion of the collected field measurements in the measurement space. As previously set forth, in an inversion process in the measurement space, initial estimates of the directly-related subset of model parameters are used to construct a first simulated response for the data acquisition tool. If the simulated response fails to match the collected field data within the range of uncertainty of the data acquisition tool, the estimates of the directly-related subset of model parameters are adjusted and a subsequent simulated response for the data acquisition tool constructed. The process is repeated until the simulated response matches the collected field data. After determining the directly-related subset of model parameters at step 116, the method proceeds to step 118 where the directly-related subset of model parameters are used to determine the misfit object function $O_{mis}$ set forth in Equation (3).

Here, however, the indirectly-related subset of model parameters has already been determined from an application of the inversion process in the pattern space. As a result, proceeding on to step 120, the suitability of the directly-related subset of model parameters may be readily determined by examining the misfit object function $O_{mis}$. More specifically, the misfit object function $O_{mis}$ should reach its lowest point at the determined value for the indirectly-related subset of model parameters. Thus, if the lowest point of the misfit object function $O_{mis}$ is not at the determined value for the indirectly-related subset of model parameters (within, of course, a predetermined range of uncertainty), it is determined that further processing is required and the method returns to step 114 for further processing in the manner previously described. Here, however, rather than using the estimates for the directly-related subset of model parameters determined at step 110, the values for the directly-related subset of model parameters previously determined at step 116 are used in subsequent iterations of the process. As a result, the subsequent determination of the indirectly-related subset of model parameters occurring at step 116 shall more closely approximate the actual value of the indirectly-related subset of model parameters than the prior determination thereof.

Returning to step 120, upon determining that the misfit object function $O_{mis}$ reaches its lowest point at the value for the indirectly-related subset of model parameter determined at the immediately preceding execution of step 116, the method concludes that suitable values for the indirectly-related and direct-related subsets of model parameters have been determined. The method will then proceed to step 122 where a data model is constructed using the indirectly-related subset of model parameters determined by an inversion of the collected field measurements in the pattern space at step 114 and the directly-related subset of model parameters determined by an inversion of the collected field measurements in the measurement space at step 116. The method will then end at step 118.

Figure 15:
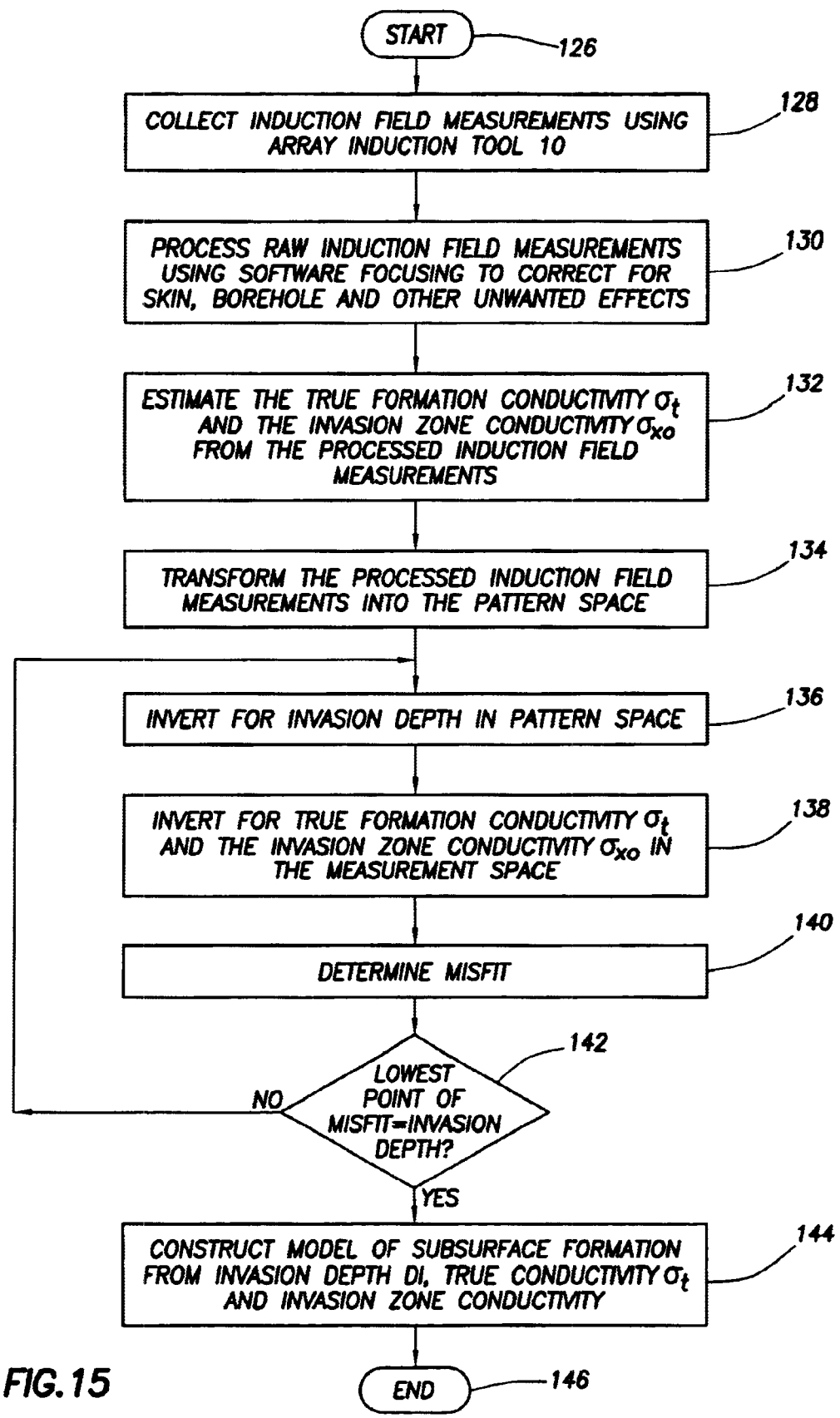
FIG. 15 is a flowchart of a method of constructing a data model of the conductivity of a subsurface formation by combining information derived during an inversion processing of resistivity measurements, acquired for the subsurface formation using an array induction tool, in measurement space with information derived during a 1-D inversion processing of the acquired resistivity measurements in a selected pattern space.

Referring next to FIG. 15, a method of constructing a data model of the conductivity of a subsurface geophysical formation 23 using a technique which hybridizes the QPR inversion technique of FIG. 13 with conventional inversion techniques by combining information derived during an inversion processing of resistivity measurements, acquired for the subsurface geophysical formation 23 using the array induction tool 10, in measurement space with information derived during a 1-D inversion processing of the acquired resistivity measurements in a selected pattern space will now be described in greater detail. Recalling that the conductivity of a subsurface geophysical formation 23 is related to the inverse of the resistivity thereof and further recalling that, as previously set forth, Equation (3) indicated that a measurement of conductivity within the subsurface formation 23 is directly related to both the true formation conductivity $\sigma_t$ and the invasion zone conductivity $\sigma_{xo}$ and indirectly related to the geometries of the invasion zone (which, in a 1-D inversion, consists of the invasion depth DI), it may be said that, it for a subsurface geophysical formation 23 described by a plurality of parameters, the true formation conductivity $\sigma_t$ and the invasion zone conductivity $\sigma_{xo}$ collectively form a directly-related subset of the plurality of parameters for the subsurface geophysical formation 23 while the invasion depth DI forms an indirectly-related subset of the plurality of parameters for the subsurface geophysical formation. The use of the invasion depth parameter DI as the sole indirect parameter presumes, of course, that the assumed profile for $\sigma(r)$ is the step profile 2 illustrated in FIG. 1a. If, however, the linear transition profile 4 illustrated in FIG. 1b is used as the assumed profile for $\sigma(r)$, indirect parameters D1 and D2 must be used instead.

Construction of the data model commences at step 126 and, at step 128, a signal is generated by operating the transmitter T of the array induction tool 10 at first and second frequencies $f_1$ and $f_2$, for example, 8 kHz and 32 kHz, simultaneously, in the borehole 12. A set of raw measurements of formation conductivity for the subsurface geophysical formation 23 are subsequently collected by the receiver-sets 34, 36, 38, 40, 42, 44, 46, 48, 50 and 52 of the array induction tool 10. The set of raw measurements of formation conductivity collected by the array induction tool 10 is comprised of a first log having a 1-foot vertical resolution, a second log having a 2-foot vertical resolution and a third log having a 3-foot vertical resolution.

Continuing on to step 130, the raw induction field measurements must now be converted into units of apparent conductivity. This is done using tool constants calculated during shop-calibration. Next, the sonde errors are subtracted from each measurement, again using tool constants calculated during shop-calibration. At this point, there are 10 different apparent conductivity signals, both in-phase and quadrature, at the two operating frequencies $f_1$ and $f_2$. Using any one of a variety of suitable algorithms known in the art, the caliper information and mud resistivity measurements are then convolved to subtract out the cave effect from each measurement by a receiver-set. At this step in the method, twenty sets of filter coefficients $f_{ij}$, one for each frequency $f_1$, $f_2$ at which one of the ten receiver coil sets 34, 36, 38, 40, 42, 44, 46, 48, 50 and 52 is operated, must be constructed. Depth matching is then accomplished by applying the constructed deconvolution filters having the appropriate filter coefficient $f_{ij}$, to the apparent conductivity signal. There will be three sets of twenty deconvolution filters—a first set for the log having a one-foot vertical resolution, a second set for the log having a two-foot resolution and a third set for the log having a three-foot resolution. Thusly, through a process commonly referred in the art as "software focusing", the deconvolution filters accomplish the following: skin-effect correction, shoulder-effect correction, depth alignment, symmetrization (in the absence of invasion) and resolution matching. After deconvolution, the measurements from the lower receiver coil sets 46, 48, 50 and 52 are combined with the corresponding measurements from the matching upper receiver coil sets 34, 36, 38 and 40. This results in six different depths of investigations. The deepest four of the six depths of investigation will be fully symmetric in depth in the presence of invasion. The resultant six curves, each of which plots apparent conductivity as a function of depth of investigation are then combined with various weighting functions to produce the final 10, 20, 30, 60, 90 and 120 inch depths of investigation.

After processing the raw induction field measurements acquired by the array induction tool 10 in the manner hereinabove described, the method proceeds to step 132 where the directly-related subset (true formation conductivity $\sigma_t$ and the invasion zone conductivity $\sigma_{xo}$) of the plurality of parameters for the subsurface geophysical formation 23 are estimated from the processed induction field measurements of formation conductivity. At step 134, the processed induction field measurements $\Omega_a$, where $\Omega_a = \{\sigma_a^{\ 1}, \sigma_a^{\ 2}, \sigma_a^{\ 3}, \sigma_a^{\ 4}, \sigma_a^{\ 5}\}$, are transformed into a selected pattern space, here, again, a pattern space defined by the equation:

$$\Psi = \{\delta^1, \delta^2, \delta^3, \delta^4, \delta^5\}$$

where $$\delta^i = \frac{\sigma_a^j - \sigma_a^{j+1}}{\sigma_a^1 - \sigma_a^6};$$

$\delta^i$ is the $i^{th}$ element of the pattern vector transformed into the pattern space; and $\sigma_a^i$ is the $i^{th}$ element of the measured conductivity at one of the six investigation depths.

After transforming the collected field measurements into the selected pattern space, the method proceeds to step 136 for determination of the invasion depth DI for the subsurface geophysical formation 23 using an inversion process in the selected pattern space. In an inversion process in the pattern space, an initial value for the invasion depth DI is determined by applying the quantitative pattern recognition object function $O_{QPR}$ set forth in Equation (10) to the elements $\{\delta^1, \delta^2, \delta^3, \delta^4, \delta^5\}$ of the pattern vector $\Psi$ to solve for the value of invasion depth DI. The value of invasion depth DI is then used to construct a first simulated response for the array induction tool 10. If the first simulated response for the array induction tool 10 does not match the collected field data within the range of uncertainty for the array induction tool 10, the value of the invasion depth DI is adjusted and a subsequent simulated response for the array induction tool 10 is constructed. The process is then repeated until the simulated response matches the collected field data.

Upon determining a value for the invasion depth DI at step 136, the method proceeds to step 138, where values for the true formation conductivity $\sigma_t$ and the invasion zone conductivity $\sigma_{xo}$ are determined from an inversion of the collected field measurements in the measurement space. As previously set forth, in an inversion process in the measurement space, initial estimates of values for the true formation conductivity $\sigma_t$ and the invasion zone conductivity $\sigma_{xo}$ are used to construct a first simulated response for the array induction tool 10. If the simulated response fails to match the collected field data within the range of uncertainty for the array induction tool 10, the estimates of the true formation conductivity $\sigma_t$ and the invasion zone conductivity $\sigma_{xo}$ are adjusted and a subsequent simulated response for the array induction tool 10 constructed. The process is repeated until the simulated response matches the collected field data. After determining the true formation conductivity $\sigma_t$ and the invasion zone conductivity $\sigma_{xo}$ at step 138, the method proceeds to step 140 where the true formation conductivity $\sigma_t$ and the invasion zone conductivity $\sigma_{xo}$ are used to determine the misfit object function $O_{mis}$ set forth in Equation (3).

Here, however, the invasion depth DI has already been determined from an application of the inversion process in the selected pattern space. As a result, proceeding on to step 142, the suitability of the true formation conductivity $\sigma_t$ and the invasion zone conductivity $\sigma_{xo}$ may be readily determined by examining the misfit object function $O_{mis}$. More specifically, the misfit object function $O_{mis}$ should reach its lowest point at the determined value for the invasion depth DI. Thus, if the lowest point of the misfit object function $O_{mis}$ is not at the determined value for the invasion depth DI (within, of course, a predetermined range of uncertainty), it is determined that further processing is required and the method returns to step 136 for further processing in the manner previously described. Here, however, rather than using the estimates for the true formation conductivity $\sigma_t$ and the invasion zone conductivity $\sigma_{xo}$ determined at step 132, the values for the true formation conductivity $\sigma_t$ and invasion zone conductivity $\sigma_{xo}$ previously determined at step 138 are used in subsequent iterations of the process. As a result, the subsequent determination of the invasion depth DI occurring at the next execution of step 136 shall more closely approximate the actual value of the invasion depth DI than the prior determination thereof.

Returning to step 140, upon determining that the misfit object function $O_{mis}$ reaches its lowest point at the value for the invasion depth DI determined at the immediately preceding execution of step 136, the method concludes that suitable values for the invasion depth DI, the true formation conductivity $\sigma_t$ and the invasion zone conductivity $\sigma_{xo}$ have been determined. The method will then proceed to step 144 where a data model of the subsurface geophysical formation 23 under investigation is constructed using the value for the invasion depth DI determined by an inversion of the collected field measurements in the pattern space at step 136 and the true conductivity $\sigma_t$ and invasion zone conductivity $\sigma_{xo}$ determined by an inversion of the collected field measurements in the measurement space at step 138. The method will then end at step 146.

Figure 16:
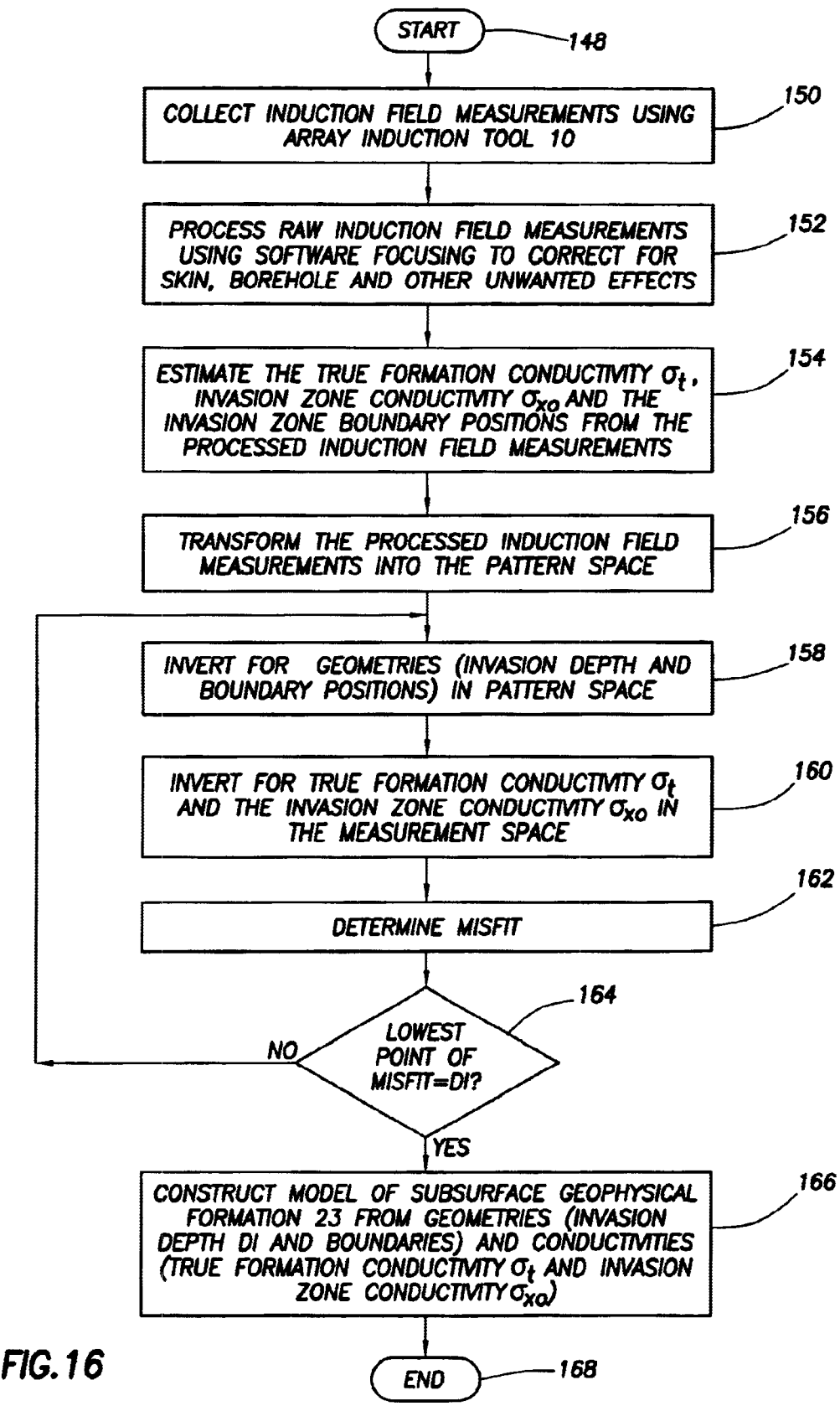
FIG. 16 is a flowchart of a method of constructing a data model of the conductivity of a subsurface formation by combining information derived during an inversion processing of resistivity measurements, acquired for the subsurface formation using an array induction tool, in measurement space with information derived during a 2-D inversion processing of the acquired resistivity measurements in a selected pattern space.

Referring next to FIG. 16, a method of constructing a data model of the conductivity of a subsurface formation 23 using a technique which hybridizes the QPR inversion technique of FIG. 13 with conventional inversion techniques by combining information derived during an inversion processing of resistivity measurements, acquired for the subsurface formation using the array induction tool 10, in measurement space with information derived during a 2-D inversion processing of the acquired resistivity measurements in a selected pattern space will now be described in greater detail. Like the 1-D inversion of the collected induction field measurements hereinabove described with respect to FIG. 15, in a 2-D inversion of the collected induction field measurements, the true formation conductivity $\sigma_t$ and the invasion zone conductivity $\sigma_{xo}$ are direct parameters and the geometries of the invasion zone is an indirect parameters. In the 1-D inversion, only the invasion depth DI needed to be taken into account when considering the geometries of the invasion zone. In the 2-D inversion, however, both the invasion depth and the boundary position must be taken into account when considering the geometries of the invasion zone. If the geometries of the invasion zone are known, then the true formation conductivity $\sigma_t$ and the invasion zone conductivity $\sigma_{xo}$ are linearly related to the induction field measurements collected using the array induction tool 10 and can be solved with linear optimization. Conversely, the geometries of the invasion zone are nonlinearly related to the collected induction field measurements and can only be solved with nonlinear optimization. When the misfit object function $O_{mis}$ is used, the two groups of model parameters, here, the conductivities and the geometries, cannot be successfully separated and solved sequentially. However, by using the QPR inversion techniques disclosed herein, a 2-D inversion may be successfully implemented in the manner described herein Construction of a 2-D data model commences at step 148 and, at step 150, a signal is generated by operating the transmitter T of the array induction tool 10 at first and second frequencies $f_1$ and $f_2$, for example, 8 kHz and 32 kHz, simultaneously, in the borehole 12. A set of raw measurements of formation conductivity for the subsurface geophysical formation 23 are subsequently collected by the receiver-sets 34, 36, 38, 40, 42, 44, 46, 48, 50 and 52 of the array induction tool 10. The set of raw measurements of formation conductivity collected by the array induction tool 10 is comprised of a first log having a 1-foot vertical resolution, a second log having a 2-foot vertical resolution and a third log having a 3-foot vertical resolution.

Continuing on to step 152, the raw induction field measurements are now converted into units of apparent conductivity. This is done using tool constants calculated during shop-calibration. Next, the sonde errors are subtracted from each measurement, again using tool constants calculated during shop-calibration. At this point, there are 10 different apparent conductivity signals, both in-phase and quadrature, at the two operating frequencies $f_1$ and $f_2$. Using any one of a variety of suitable algorithms known in the art, the caliper information and mud resistivity measurements are then convolved to subtract out the cave effect from each measurement by a receiver-set. At this step in the method, twenty sets of filter coefficients $f_{ij}$, one for each frequency $f_1$, $f_2$ at which one of the ten receiver coil sets 34, 36, 38, 40, 42, 44, 46, 48, 50 and 52 is operated, must be constructed. Depth matching is then accomplished by applying the constructed deconvolution filters having the appropriate filter coefficient $f_{ij}$, to the apparent conductivity signal. There will be three sets of twenty deconvolution filters—a first set for the log having a one-foot vertical resolution, a second set for the log having a two-foot resolution and a third set for the log having a three-foot resolution. Thusly, through a process commonly referred in the art as "software focusing", the deconvolution filters accomplish the following: skin-effect correction, shoulder-effect correction, depth alignment, symmetrization (in the absence of invasion) and resolution matching. After deconvolution, the measurements from the lower receiver coil sets 46, 48, 50 and 52 are combined with the corresponding measurements from the matching upper receiver coil sets 34, 36, 38 and 40. This results in six different depths of investigations. The deepest four of the six depths of investigation will be fully symmetric in depth in the presence of invasion. The resultant six curves, each of which plots apparent conductivity as a function of depth of investigation are then combined with various weighting functions to produce the final 10, 20, 30, 60, 90 and 120 inch depths of investigation.

After processing the raw induction field measurements acquired by the array induction tool 10 in the manner hereinabove described, the method proceeds to step 154 where the directly-related subset (true formation conductivity $\sigma_t$ and the invasion zone conductivity $\sigma_{xo}$) of the plurality of parameters for the subsurface geophysical formation 23 are estimated from the processed induction field measurements of formation conductivity. Preferably, a first portion of the indirectly-related subset of the model parameters, specifically, the boundaries of the invasion zone, are also estimated at step 154. Continuing on to step 156, the processed induction field measurements $\Omega_a$, where $\Omega_a = \{\sigma_a^1, \sigma_a^2, \sigma_a^3, \sigma_a^4, \sigma_a^5, \sigma_a^6\}$, are transformed into a selected pattern space, here, again, a pattern space defined by the equation:

$$\Psi = \{\delta^1, \delta^2, \delta^3, \delta^4, \delta^5\}$$

where $$\delta^i = \frac{\sigma_a^j - \sigma_a^{j+1}}{\sigma_a^1 - \sigma_a^6};$$

$\delta^i$ is the $i^{th}$ element of the pattern vector transformed into the pattern space; and $\sigma_a^i$ is the $i^{th}$ element of the measured conductivity at one of the six investigation depths. After transforming the collected field measurements into the selected pattern space, the method proceeds to step 158 for determination of the boundaries of the invasion zone and the invasion depth DI for the subsurface geophysical formation 23. Again, an inversion process in the selected pattern space is used for this determination. More specifically, in an inversion process in the pattern space, initial values for the invasion zone boundaries and the invasion depth DI are determined by applying the quantitative pattern recognition object function $O_{QPR}$ set forth in Equation (10) to the elements $\{\delta^1, \delta^2, \delta^3, \delta^4, \delta^5\}$ of the pattern vector $\Psi$. The determined values of the invasion zone boundaries and the invasion depth DI are then used to construct a first simulated response for the array induction tool 10. If the first simulated response for the array induction tool 10 does not match the collected field data within the range of uncertainty for the array induction tool 10, the values for the invasion zone boundaries and the invasion depth DI are adjusted and a subsequent simulated response for the array induction tool 10 is constructed. The process is then repeated until the simulated response matches the collected field data.

Upon determining values for the boundaries of the invasion zone and the invasion depth DI at step 158, the method proceeds to step 160, where values for the true formation conductivity $\sigma_t$ and the invasion zone conductivity $\sigma_{xo}$ are determined from an inversion of the collected field measurements in the measurement space. As previously set forth, in an inversion process in the measurement space, initial estimates of values for the true formation conductivity $\sigma_t$ and the invasion zone conductivity $\sigma_{xo}$ are used to construct a first simulated response for the array induction tool 10. If the simulated response fails to match the collected field data within the range of uncertainty for the array induction tool 10, the estimates of the true formation conductivity $\sigma_t$ and the invasion zone conductivity $\sigma_{xo}$ are adjusted and a subsequent simulated response for the array induction tool 10 constructed. The process is repeated until the simulated response matches the collected field data. After determining the true formation conductivity $\sigma_t$ and the invasion zone conductivity $\sigma_{xo}$ at step 160, the method proceeds to step 160 where the true formation conductivity $\sigma_t$ and the invasion zone conductivity $\sigma_{xo}$ are used to determine the misfit object function $O_{mis}$ set forth in Equation (3).

Here, however, the invasion depth DI has already been determined from an application of the inversion process in the selected pattern space. As a result, proceeding on to step 164, the suitability of the determined values for the formation conductivity $\sigma_t$ and the invasion zone conductivity $\sigma_{xo}$ may be readily ascertained by an examination of the misfit object function $O_{mis}$. More specifically, the misfit object function $O_{mis}$ should reach its lowest point at the determined value for the invasion depth DI. Thus, if the lowest point of the misfit object function $O_{mis}$ is not at the determined value for the invasion depth DI (within, of course, a predetermined range of uncertainty), it is determined that further processing is required and the method returns to step 158 for further processing in the manner previously described. Here, however, rather than using the estimates for the true formation conductivity $\sigma_t$, the invasion zone conductivity $\sigma_{xo}$ and the invasion zone boundaries determined at step 154, the values for the invasion zone boundaries previously determined at step 158 and the values for the true formation conductivity $\sigma_t$ and the invasion zone conductivity $\sigma_{xo}$ previously determined at step 160 are used in subsequent iterations of the process. As a result, the subsequent determination of the boundaries of the invasion zone and the invasion depth DI occurring at the next execution of step 158 shall more closely approximate the actual values of the invasion zone boundaries and the invasion depth DI than the prior determination thereof.

Returning to step 160, upon determining that the misfit object function $O_{mis}$ reaches its lowest point at the value for the invasion depth DI determined at the immediately preceding execution of step 158, the method concludes that suitable values for the invasion zone boundaries, the invasion depth DI, the true formation conductivity $\sigma_t$ and the invasion zone conductivity $\sigma_{xo}$ have been determined. The method will then proceed to step 166 where a 2-D data model of the subsurface geophysical formation 23 under investigation is constructed using the values for the invasion zone boundaries and the invasion depth DI determined by an inversion of the collected field measurements in the pattern space at step 158 and the true conductivity $\sigma_t$ and invasion zone conductivity $\sigma_{xo}$ determined by an inversion of the collected field measurements in the measurement space at step 160. The method will then end at step 146.

Thus, there has been described and illustrated herein, a method of constructing a data model defined by a plurality of parameters which advantageously generates a more stable solution for the model with greater efficiency and enhanced resolution of certain parameters. There has been further described herein, an application of such techniques to the construction of a data model of a subsurface geophysical formation. It should be clearly understood, however, that numerous variations and modifications of the techniques disclosed herein will become apparent to those skilled in the art once the above disclosure is fully appreciated. For example, in the foregoing disclosure, an application of QPR inversion techniques to an inversion of array induction measurements was described. It should be clearly understood, however, that the techniques disclosed herein are equally applicable to a broad variety of inversion problems. For example, many model parameters such as borehole size, relative dip angle, anisotropy, permeability, frequency dispersion and wettability are all model parameters about which the information may be derived from trends in the measurements. As a result, while solving for parameters such as these is difficult using convention misfit object functions, the QPR inversion techniques disclosed herein are readily applicable thereto. Nor should the techniques disclosed herein be limited to downhole applications. Rather, it is fully contemplated that the disclosed techniques are suitable for use in a wide variety of applications where a solution for one or more indirectly related parameters is sought. Accordingly, it is fully intended that the following claims be interpreted to embrace all such variations and modifications.

What is claimed is:

1. A method of constructing a data model defined by a plurality of parameters, comprising:
    collecting a plurality of field measurements, each of said plurality of field measurements bearing an indirect relationship to a first subset of said plurality of parameters;
    transforming said collected plurality of field measurements into a selected pattern space;
    determining values for said first subset of said plurality of parameters from said collected plurality of field measurements after transformation, of said collected plurality of field measurements, into said selected pattern space; and
    constructing said data model using said determined values for said first subset of parameters.

2. The method of claim 1, wherein determining values for said first subset of said plurality of parameters from said collected plurality of field measurements after transformation, of said collected plurality of field measurements, into said selected pattern space further comprises inverting said transformed collected plurality of field measurements.

3. The method of claim 2, wherein said selected pattern space is derived from a trend, in a measurement space, for said collected plurality of field measurements.

4. The method of claim 3, wherein said trend is a pattern vector.

5. The method of claim 1, wherein each of said plurality of field measurements bears a direct relationship to a second subset of said plurality of parameters.

6. The method of claim 5, and further comprising estimating values for said second subset of said plurality of parameters from said collected plurality of field measurements.

7. The method of claim 6, and further comprising constructing said data model using said determined values for said first subset of parameters and said estimated values for said second subset of parameters.

8. The method of claim 7, wherein determining values for said first subset of said plurality of parameters from said collected plurality of field measurements after transformation, of said collected plurality of field measurements, into said selected pattern space further comprises inverting said transformed collected plurality of field measurements.

9. The method of claim 8, wherein said selected pattern space is derived from a trend, in a measurement space, for said collected plurality of field measurements.

10. The method of claim 9, wherein said trend is a pattern vector.

11. The method of claim 10, wherein each one of said plurality of collected measurements is a measurement of conductivity for a subsurface formation and wherein said data model is a conductivity model for said subsurface formation.

12. A method of constructing a data model defined by a plurality of parameters, comprising:
    collecting a plurality of field measurements, each of said plurality of field measurements bearing an indirect relationship to a first subset of said plurality of parameters and a direct relationship to a second subset of said plurality of parameters;
    estimating values for said second subset of parameters from said collected plurality of field measurements;
    transforming said collected plurality of field measurements into a selected pattern space;
    determining values for said first subset of said plurality of parameters from said collected plurality of field measurements after transformation, of said collected plurality of field measurements, into said selected pattern space;
    determining, in a measurement space, values for said second subset of said plurality of parameters from said collected plurality of field measurements and said determined values for said first subset of parameters; and
    constructing said data model using said determined values for said first subset of said plurality of parameters and said determined values for said second subset of said plurality of parameters.

13. The method of claim 12, wherein determining values for said first subset of said plurality of parameters from said collected plurality of field measurements after transformation, of said collected plurality of field measurements, into said selected pattern space further comprises inverting said transformed collected plurality of field measurements.

14. The method of claim 13, wherein said selected pattern space is derived from a trend, in a measurement space, for said collected plurality of field measurements.

15. The method of claim 14, wherein said trend is a pattern vector.

16. The method of claim 13, wherein determining values for said second subset of said plurality of parameters further comprises inverting said collected plurality of field measurements in said measurement space.

17. The method of claim 16, and further comprising iteratively re-determining said first subset of parameters and said second subset of parameters until said first subset of parameters converges on a solution.

18. The method of claim 17, wherein said selected pattern space is derived from a trend, in a measurement space, for said collected plurality of field measurements.

19. The method of claim 18, wherein said trend is a pattern vector.

20. The method of claim 17 wherein said first subset of said plurality of parameters includes a first indirect parameter X and said second subset of said plurality of parameters includes a first direct parameter Y and a second direct parameter Z.

21. The method of claim 20, and further comprising iteratively re-determining said first subset of parameters and said second subset of parameters until an object function $O_{QPR}$ converges, within a predetermined threshold value, on a solution for said first indirect parameter X.

22. The method of claim 21, wherein said solution for said first indirect parameter X is located at a minimum point of a plot of said object function $O_{QPR}$.

23. The method of claim 22, wherein said selected pattern space is derived from a trend, in a measurement space, for said collected plurality of field measurements.

24. The method of claim 23, wherein said trend is a pattern vector.

25. The method of claim 24, wherein collecting a plurality of field measurements further comprises:

collecting a plurality of raw measurements; and processing said plurality of raw measurements to correct for possible adverse effects thereon.

26. The method of claim 17, wherein each one of said plurality of collected measurements is a measurement of conductivity for a subsurface formation and wherein said data model is a conductivity model for said subsurface formation.

27. An apparatus for determining at least one characteristic of a subsurface formation, comprising:

a logging tool having a transmitter and at least one receiver array, said logging tool acquiring geophysical measurements related to said subsurface geophysical formation; and a computing device coupled to said logging tool, said computing device programmed to:

transform said acquired geophysical measurements into a selected pattern space; and calculate, in said pattern space, a subset of indirect parameters for said subsurface formation from said transformed geophysical measurements.

28. The apparatus of claim 27, wherein said computing device is further programmed to calculate, in a measurement space, a subset of direct parameters for said subsurface formation from said geophysical measurements acquired by said logging tool.

29. The apparatus of claim 28, wherein said computing device is further programmed to execute pattern space inversion processing of said acquired geophysical measurements.

30. The apparatus of claim 29, wherein said computing device is further programmed to execute measurement space inversion processing of said acquired geophysical measurements.

31. The apparatus of claim 30, wherein said computing device is further programmed to construct a data model of said subsurface formation from said calculated subset of indirect parameters and said calculated subset of direct parameters.

32. The apparatus of claim 31, wherein said computing device may be further programmed to:

re-calculate said subset of indirect parameters for said subsurface formation based upon said calculated subset of direct parameters; and re-calculate said subset of direct parameters based upon said calculated subset of indirect parameters.

33. The apparatus of claim 32, wherein said computing device is further programmed to construct a data model of said subsurface formation from said re-calculated subset of indirect parameters and said re-calculated subset of direct parameters.

34. The apparatus of claim 27, wherein said computing device is locally disposed in said logging tool.

35. The apparatus of claim 27, wherein said computing device is a processor remotely disposed on a surface computer.

* * * * *